US011928485B2

(12) United States Patent
Wu et al.

(10) Patent No.: US 11,928,485 B2
(45) Date of Patent: Mar. 12, 2024

(54) DATA TRANSMISSION METHOD AND APPARATUS, TERMINAL, AND STORAGE MEDIUM

(71) Applicant: TENCENT TECHNOLOGY (SHENZHEN) COMPANY LIMITED, Shenzhen (CN)

(72) Inventors: Zhiying Wu, Shenzhen (CN); Xuejun Sun, Shenzhen (CN); Jinhui Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/964,393

(22) Filed: Oct. 12, 2022

(65) Prior Publication Data

US 2023/0032666 A1 Feb. 2, 2023

Related U.S. Application Data

(63) Continuation of application No. PCT/CN2021/108878, filed on Jul. 28, 2021.

(30) Foreign Application Priority Data

Aug. 29, 2020 (CN) .......................... 202010890571.2

(51) Int. Cl.
*G06F 9/451* (2018.01)
*G06F 3/0486* (2013.01)
(Continued)

(52) U.S. Cl.
CPC ............ *G06F 9/451* (2018.02); *G06F 3/0486* (2013.01); *G06F 3/0488* (2013.01); *H04L 51/08* (2013.01); *H04L 51/52* (2022.05)

(58) Field of Classification Search
CPC ...... G06F 9/451; G06F 3/0486; G06F 3/0488; H04L 51/08; H04L 51/52
See application file for complete search history.

(56) References Cited

U.S. PATENT DOCUMENTS 7,383,308 B1 * 6/2008 Groves ................... H04L 51/04
709/212
10,607,380 B2 * 3/2020 Ekstrand ............... H02J 7/0063
(Continued)

FOREIGN PATENT DOCUMENTS

| CN | 100407686 C | 7/2008 |
| CN | 102891891 A | 1/2013 |

(Continued)

OTHER PUBLICATIONS

The World Intellectual Property Organization (WIPO) International Search Report for PCT/CN2021/108878 dated Oct. 20, 2021 7 Pages (including translation).

(Continued)

*Primary Examiner* — Keith D Bloomquist
(74) *Attorney, Agent, or Firm* — ANOVALAW GROUP PLLC

(57) ABSTRACT

A data transmission method includes: displaying a target message in a session interface; in response to a trigger operation on the target message, outputting a resource transmission interface including an object display region and an icon display region; and the object display region including an object identifier of at least one transmission object, and the icon display region including a message icon corresponding to the target message; moving the message icon from the icon display region to the object display region according to a moving operation on the message icon; and transmitting, in response to the message icon being moved to the object display region, the data resource to a target transmission object of the at least one transmission object in (Continued)

the object display region, the target transmission object being determined according to an ending position of a movement track of the message icon corresponding to the moving operation.

19 Claims, 25 Drawing Sheets

(51) Int. Cl.
*G06F 3/0488* (2022.01)
*H04L 51/08* (2022.01)
*H04L 51/52* (2022.01)

(56) References Cited

U.S. PATENT DOCUMENTS

| | | | | |
|---|---|---|---|---|
| 2003/0084109 | A1* | 5/2003 | Balluff | H04M 1/2478 709/206 |
| 2005/0021883 | A1* | 1/2005 | Shishizuka | H04N 1/32358 710/20 |
| 2007/0234227 | A1* | 10/2007 | Prinsen | G06F 3/0486 715/810 |
| 2009/0280845 | A1* | 11/2009 | Kim | H04M 1/7243 455/466 |
| 2010/0070899 | A1* | 3/2010 | Hunt | G06F 3/0486 709/204 |
| 2010/0085318 | A1* | 4/2010 | Lee | G06F 3/0482 345/173 |
| 2011/0083111 | A1* | 4/2011 | Forutanpour | H04W 4/21 715/863 |
| 2014/0184510 | A1* | 7/2014 | Jeong | G06F 3/03543 345/163 |
| 2017/0048686 | A1* | 2/2017 | Chang | H04W 52/0209 |
| 2017/0054663 | A1 | 2/2017 | Geiger et al. | |
| 2018/0091660 | A1* | 3/2018 | Lu | G06F 3/0484 |
| 2018/0205772 | A1* | 7/2018 | Panchbudhe | H04L 51/066 |
| 2019/0147028 | A1* | 5/2019 | Hare | G06F 40/174 715/221 |
| 2019/0222632 | A1* | 7/2019 | He | G06F 3/04883 |
| 2023/0153274 | A1* | 5/2023 | Liu | G06F 3/0486 707/608 |

FOREIGN PATENT DOCUMENTS

| | | |
|---|---|---|
| CN | 108228031 A | 6/2018 |
| CN | 110174994 A | 8/2019 |
| CN | 110519153 A | 11/2019 |
| CN | 112054950 A | 12/2020 |
| EP | 2530919 A1 | 12/2012 |
| EP | 2674834 A2 | 12/2013 |
| EP | 2741243 A1 | 6/2014 |

OTHER PUBLICATIONS

The European Patent Office (EPO) The Extended European Search Report for 21860023.7, dated Oct. 4, 2023 10 Pages (including translation).

* cited by examiner

• Represent a reference point of a message icon
→ Represent a movement track of a message icon

DATA TRANSMISSION METHOD AND APPARATUS, TERMINAL, AND STORAGE MEDIUM

CROSS-REFERENCES TO RELATED APPLICATIONS

This application is a continuation application of PCT Patent Application No. PCT/CN2021/108878, entitled "DATA TRANSMISSION METHOD AND DEVICE, TERMINAL, AND STORAGE MEDIUM" and filed on Jul. 28, 2021, which claims priority to Chinese Patent Application No. 202010890571.2, entitled "RESOURCE TRANSMISSION METHOD AND APPARATUS, TERMINAL, AND MEDIUM" filed on Aug. 29, 2020, the entire contents of both of which are incorporated herein by reference.

FIELD OF THE TECHNOLOGY

The present disclosure relates to the field of Internet technologies, specifically, to the field of communication technologies, and in particular, to a data transmission method, a data transmission apparatus, a terminal, and a computer storage medium.

BACKGROUND OF THE DISCLOSURE

With the development of Internet technologies, social clients are widely accepted with their advantage of convenient communication. At present, most social clients support cross-terminal transmission of data resources. For example, when a user A intends to transmit, by using a social client in a target terminal, a data resource of a certain message in a target session to an other terminal (for example, another terminal of the user A or a terminal of a user B), many steps of operations need to be performed: the user A performs a trigger operation on the message first, to trigger the social client to output a menu option including a forwarding component; and then, clicks the forwarding component to trigger the social client to output an object selection interface, and performs a series of operations such as object selection and forwarding confirmation in the object selection interface, the data resource of the message can be transmitted to the other terminal.

SUMMARY

An embodiment of the present disclosure provides a data transmission method, performed by a terminal, the method including: displaying a target message in a session interface of a target session, the target message including a data resource; outputting a resource transmission interface in response to a trigger operation on the target message, the resource transmission interface including an object display region and an icon display region; and the object display region including an object identifier of at least one transmission object, and the icon display region including a message icon corresponding to the target message, the transmission object being an object capable of receiving the data resource corresponding to the target message; moving the message icon from the icon display region to the object display region according to a moving operation on the message icon; and transmitting, in response to the message icon being moved to the object display region, the data resource corresponding to the target message to a target transmission object of the at least one transmission object in the object display region, the target transmission object being determined according to a position of an end point of a movement track of the message icon corresponding to the moving operation.

An embodiment of the present disclosure provides a data transmission apparatus, including: a display unit, configured to display a target message in a session interface, the target message including a data resource; the display unit being configured to output a resource transmission interface in response to a trigger operation on the target message, the resource transmission interface including an object display region and an icon display region; and the object display region including an object identifier of at least one transmission object, and the icon display region including a message icon corresponding to the target message, the transmission object being an object capable of receiving the data resource corresponding to the target message; the display unit being further configured to move the message icon from the icon display region to the object display region according to a moving operation on the message icon; and a processing unit, configured to transmit, in response to the message icon being moved to the object display region, the data resource corresponding to the target message to a target transmission object of the at least one transmission object in the object display region, the target transmission object being determined according to a position of an end point of a movement track of the message icon corresponding to the moving operation.

An embodiment of the present disclosure provides a terminal. The terminal includes an input device and an output device, and further includes: a processor, adapted to implement one or more instructions; and a computer storage medium, storing one or more instructions, the one or more instructions being adapted to be loaded and executed by the processor to perform operations of the data transmission method described in the embodiments of the present disclosure.

An embodiment of the present disclosure provides a non-transitory computer storage medium, storing one or more instructions, the one or more instructions being adapted to be loaded and executed by a processor to perform operations of the data transmission method described in the embodiments of the present disclosure.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

Hereinafter, technical solutions in embodiments of the present disclosure are clearly and completely described with reference to the accompanying drawings in the embodiments of the present disclosure.

Figure 1:
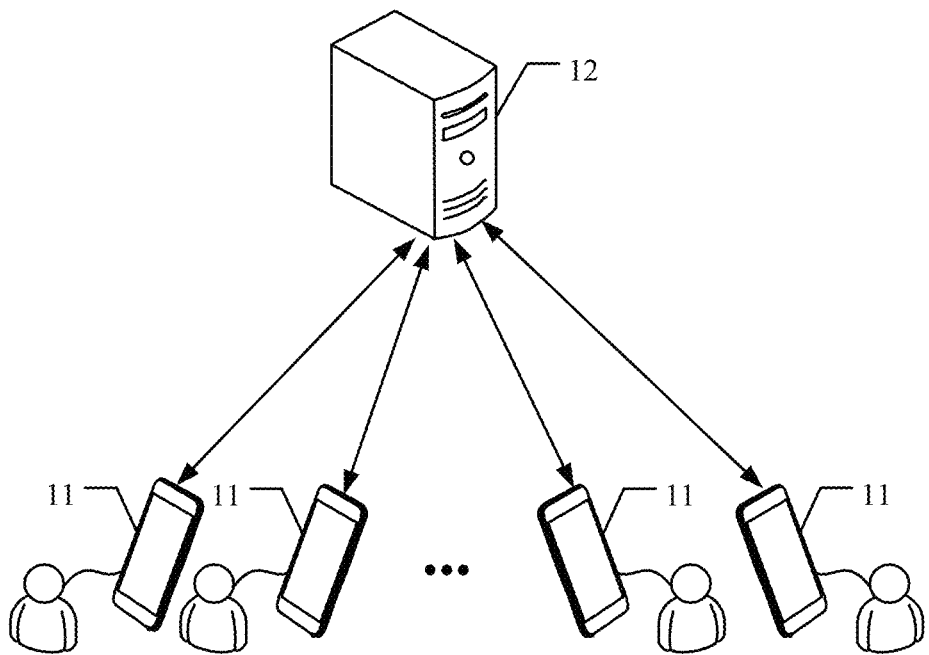
FIG. 1 is a system architecture diagram of a communication session system according to an embodiment of the present disclosure.

The embodiments of the present disclosure relate to a communication session system. The so-called communication session may also be briefly referred to as the session, and refers to a dialog in which information is exchanged and transmitted between at least two users through a certain behavior or medium. Referring to FIG. 1, the communication session system may include: at least two terminals 11 and a server 12. Communication between any terminal 11 and the server 12 may be implemented in any communication manner, such as mobile communication based on the 3rd generation partnership project (3GPP), long term evolution (LTE), or worldwide interoperability for microwave access (WiMAX), computer network communication based on Transmission Control Protocol/Internet Protocol (TCP/IP) protocol suite, or user datagram protocol (UDP), or the like.

The terminal 11 refers to any device having a communication function and a human-computer interaction function, which may specifically include, but not limited to, a smart television, a smartphone, a tablet computer, a notebook computer, a desktop computer, and the like. A social client may be installed and run in the terminal 11. The social client herein refers to an application (APP) that can implement information exchange between users in a communication session through a network. Specifically, the social client may include any one of the following: instant messaging clients (for example, Tencent QQ client, WeChat client, and WeCom client), content sharing clients (for example, Weibo client and a blog client), and the like. The so-called instant messaging refers to a terminal service that allows two or more people to instantly transmit information such as text, file, and voice and perform audio and video communication by using a network. In some embodiments, various other clients such as video clients, music playback clients, and shopping clients may be further run in the terminal 11. The server 12 is a device that can establish a communication session between social clients run in the at least two terminals 11, and can provide a plurality of services such as data storage, message push, and resource push for each social client. Specifically, the server 12 may include, but not limited to, a data server, a web server, an application server, a cloud server, or the like. It is to be understood that, when the server 12 is physically deployed, the server may be deployed as an independent service device, or the server 12 may be deployed as a cluster device together formed by a plurality of service devices, which is not limited in the embodiments of the present disclosure.

The user operation process involved in the related data transmission method is cumbersome, and the efficiency of resource transmission thereof is low. Based on the foregoing communication session system, the embodiments of the present disclosure provide a data transmission method and apparatus, a terminal, and a medium, so as to effectively simplify a user operation process of the resource transmission and improve the efficiency of the resource transmission. The resource transmission solution may be performed by a certain terminal in the communication session system or a social client run in a certain terminal. For ease of description, the embodiments of the present disclosure are described using an example in which the resource transmission solution is performed by a terminal. Specifically, the principle of the resource transmission solution is as follows: When a user A has a demand of transmitting a data resource, the user A may perform a trigger operation on a target message (a message corresponding to the data resource to be transmitted) in a session interface displayed in a terminal a. In this case, the terminal a may provide a resource transmission interface including an icon display region and an object display region for the user A; and display a message icon corresponding to the target message in the icon display region and display an object identifier of at least one transmission object in the object display region. The message icon refers to a movable operation control, and the transmission object refers to an object capable of receiving the data resource corresponding to the target message. Then, the user A may move the message icon to the object display region, to trigger the terminal a to determine a target object from the at least one transmission object according to an end point of a movement track of the message icon and transmit the data resource corresponding to the target message to the target object. Correspondingly, after detecting that the message icon is located in the object display region, the terminal a may request the server to transmit the data resource corresponding to the target message to the target object.

It can be seen that, the resource transmission solution provided by this embodiment of the present disclosure has the following beneficial effects: By providing a convenient resource transmission interface for the user, the user can implement one-key transmission of the data resource to be transmitted to the target object through the resource transmission interface, which effectively simplifies the user operation process of the resource transmission, thereby improving the efficiency of the resource transmission.

Figure 2:
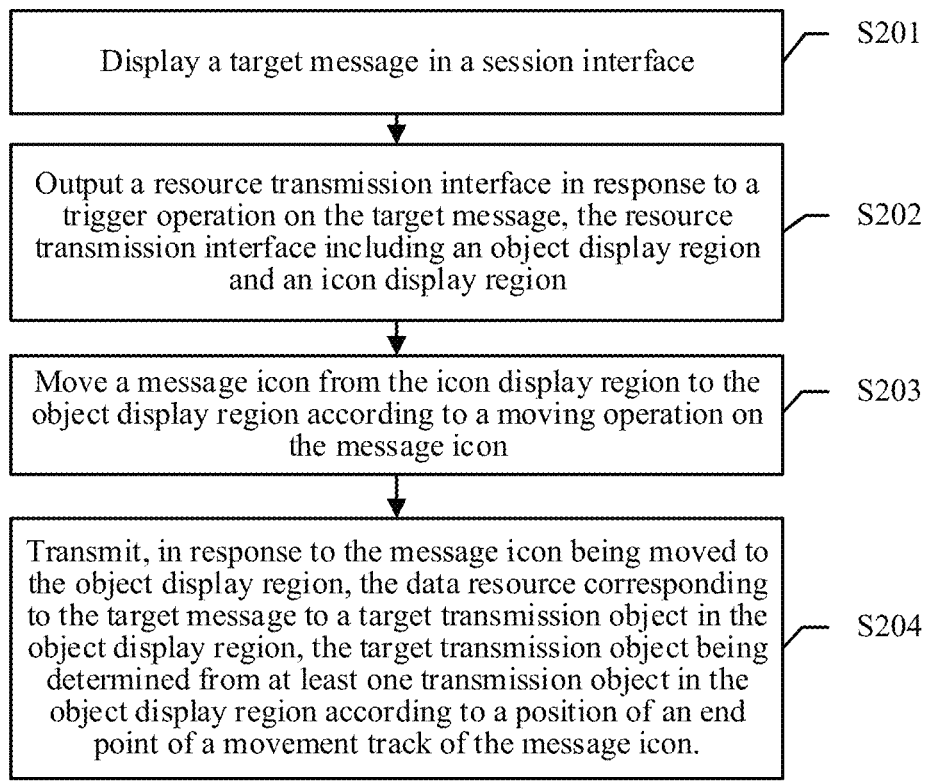
FIG. 2 is a schematic flowchart of a data transmission method according to an embodiment of the present disclosure.

Based on the foregoing description, an embodiment of the present disclosure provides a data transmission method. The data transmission method may be performed by a target terminal in the foregoing communication session system or a social client run in the target terminal. For ease of description, this embodiment of the present disclosure is described using an example in which the data transmission method is performed by a target terminal. The target terminal may be any terminal in the foregoing communication session system. Referring to FIG. 2, the data transmission method may include the following steps S201 to S204:

S201: Display a target message in a session interface.

The session interface may be an interface of a target session, and the target session may be any session containing a target user (that is, a user who logs in to a social account in the target terminal). That is, the target session may be a single-chat session between the target user and any other user, or may be a group session among the target user and at least two other users. The target message displayed in the session interface of the target session may be sent by the target user or by another user in the target session, which is not limited.

Specifically, the target message may include any one of the following: a file message, a text message, a multimedia data message, or a link message. The file message refers to a session message generated according to file information of a file, and the file information herein may include, but not limited to, a file name, a file download address, a file size (that is, a data volume), and the like. The text message refers to a session message generated according to a text content sent by a user, and the text content may include one or more of words, symbols, and stickers. The multimedia data message refers to a session message generated according to multimedia data sent by the user, and the multimedia data may be audio (for example, voice), video, or image. The image herein may be a static image or a dynamic image, and the so-called dynamic image refers to an image in which a dynamic effect is generated by image switching of a plurality of frames of static images at a preset frequency. The link message refers to a session message generated according to a link of a shared content (for example, news, songs, or games) sent by the user, and the link may be a web page link (for example, a browser web page link or an H5 web page link), a mini-program link, or the like. The so-called H5 refers to HyperText Markup Language (HTML) version 5, and the so-called mini-program refers to an application that can run without installation.

S202: Output a resource transmission interface in response to a trigger operation on the target message.

As can be known from the above-mentioned related contents of the target message, the target message may correspond to a data resource; and the data resource corresponding to the target message may be a file, a text content, multimedia data, or a link. When the target user intends to forward the data resource corresponding to the target message, the target user may perform a trigger operation on the target message. The trigger operation herein may include any one of the following: a click operation, a touch and hold operation, a voice control operation, and the like. The touch and hold operation refers to an operation of pressing the target message with a pressing duration greater than a preset duration; and the touch and hold operation may be inputted by the target user by directly touching a terminal screen of the target terminal with a finger, or may be inputted by the target user through an external device of the target terminal (for example, a mouse or a keyboard). When the touch and hold operation is inputted by the user by directly touching the terminal screen with a finger, the touch and hold operation may be a single-finger touch and hold operation, a two-finger touch and hold operation, or the like. For ease of description, subsequent description is performed using an example in which the trigger operation is the two-finger touch and hold operation.

Figure 3A:
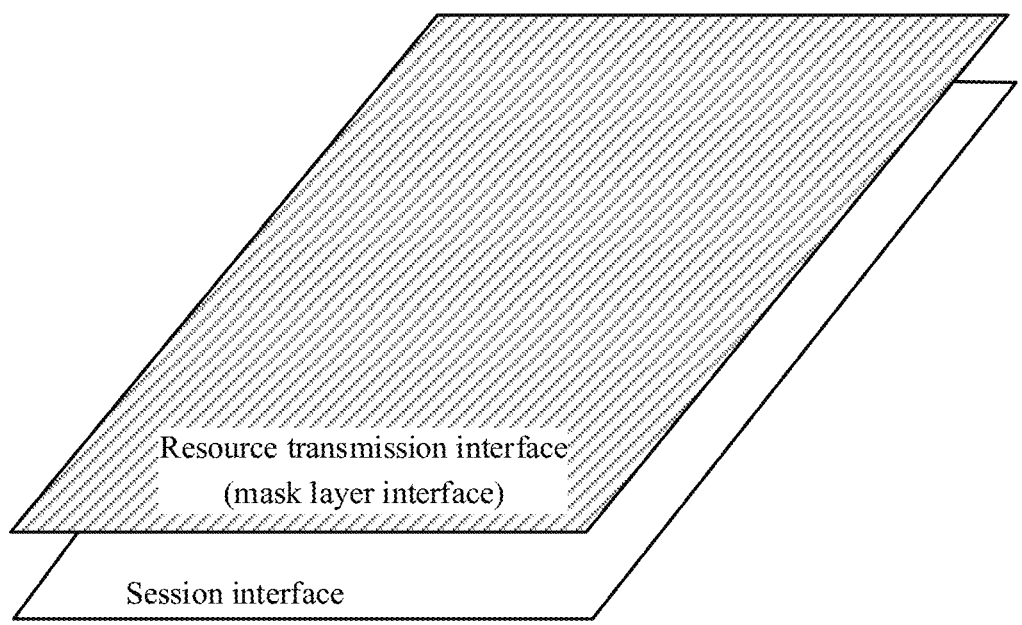
FIG. 3a is a schematic diagram of a position relationship between a resource transmission interface and a session interface according to an embodiment of the present disclosure.

Correspondingly, the target terminal may output a resource transmission interface in response to detecting the trigger operation on the target message. In one embodiment, in a case of detecting that the target message is triggered, the target terminal may directly switch from the session interface of the target session to the resource transmission interface. In one embodiment, the resource transmission interface may be an opaque user interface. In another embodiment, in a case of detecting that the target message is triggered, the target terminal may directly display the resource transmission interface above the session interface of the target session. In one embodiment, the resource transmission interface may be a mask layer interface, the so-called mask layer refers to a layer of view (the slash region shown in FIG. 3a) which is transparent and located above the resource transmission interface, and the transparency of the mask layer may be set according to actual service requirements. For ease of description, subsequent description is performed using an example in which the resource transmission interface is the mask layer interface. In one embodiment, the resource transmission interface may include an object display region 30 and an icon display region 31.

The object display region 30 may include an object identifier 33 of at least one transmission object, and the at least one transmission object includes at least one of the following: an associated terminal associated with a target terminal, and at least one other session where a target user is present. The associated terminal refers to a terminal logging in to the same social account as the target terminal. For example, the social account that is logged in to in the target terminal is set to "123456"; if the social account that is logged in to in a terminal x is "123456", the terminal x is the associated terminal of the target terminal; and if the social account that is logged in to in the terminal x is "635489", the terminal x is not the associated terminal of the target terminal. The at least one other session in which the target user is present may include any one of the following: ① a communication session preset by the target user; ② a call session, selected by the target terminal according to a session intimacy between the target user and each communication session including the target user, and having a session intimacy greater than an intimacy threshold, or a preset number of call sessions selected by the target terminal in descending order of the session intimacies, where the session intimacy herein may be calculated according to the number of times or the frequency of sending session messages by the target user in the communication session; and ③ a recent communication session selected by the target terminal from all the communication sessions to which the target user belongs according to a historical session record of the target user, where the recent communication session herein refers to a communication session with a message receiving or sending operation in a historical period of time (for example, last one week or last three days).

Correspondingly, the object identifier 33 of the at least one transmission object may include at least one of the following: a terminal identifier of the associated terminal, and a session identifier of the at least one other session. The terminal identifier of the associated terminal may include, but not limited to: a terminal name (for example, "my computer") of the associated terminal and a device icon (for example, a computer icon) used for representing the associated terminal. The session identifier of an other session may include, but not limited to, a session name (for example, a group name of a group session or a user name of another user other than the target user in a single-chat session), a session avatar (for example, a group avatar in a group session or a user avatar of another user other than the target user in a single-chat session), and the like.

Figure 3B:
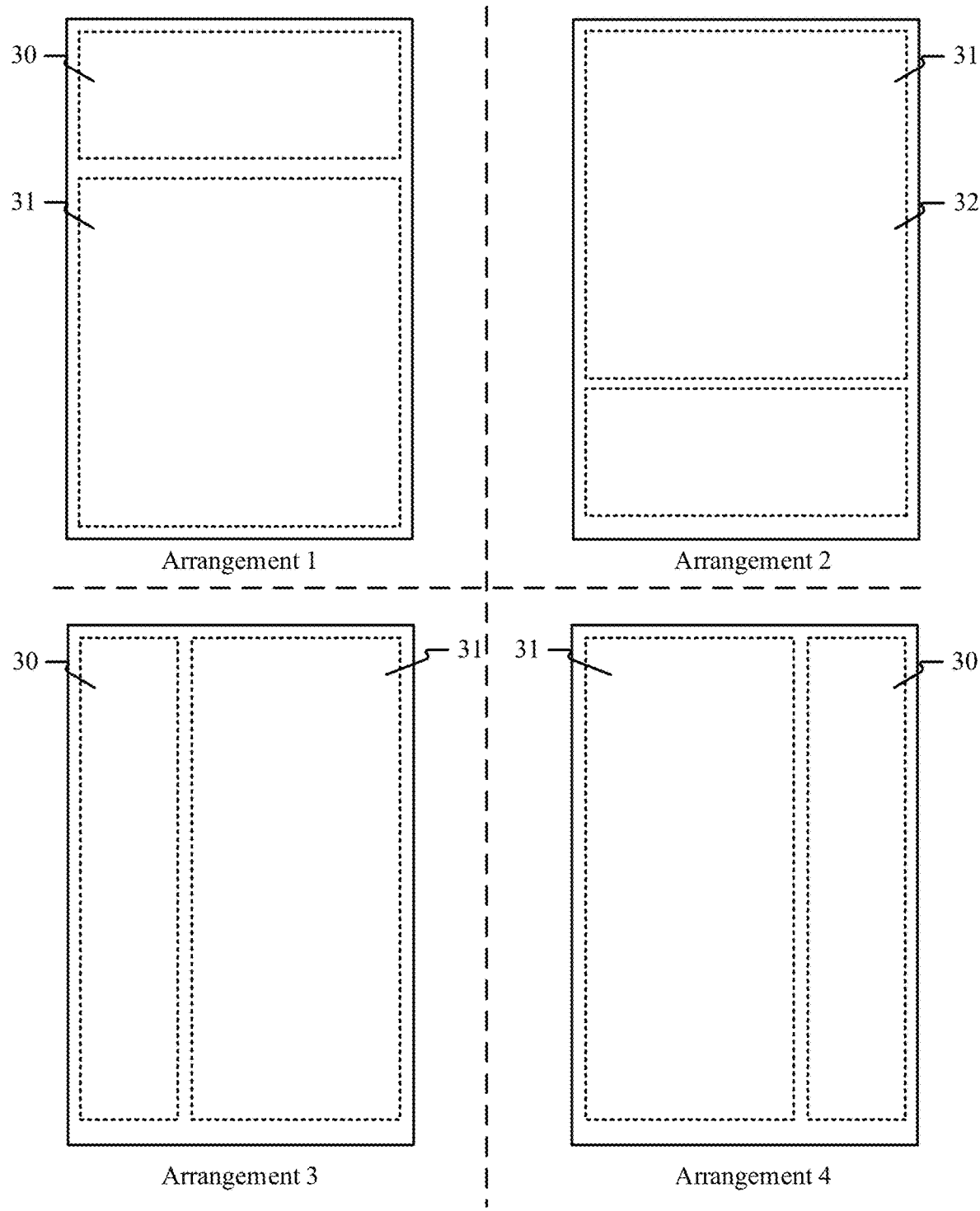
FIG. 3b is a schematic diagram of an arrangement of an object display region and an icon display region in a resource transmission interface according to an embodiment of the present disclosure.
Figure 3C:
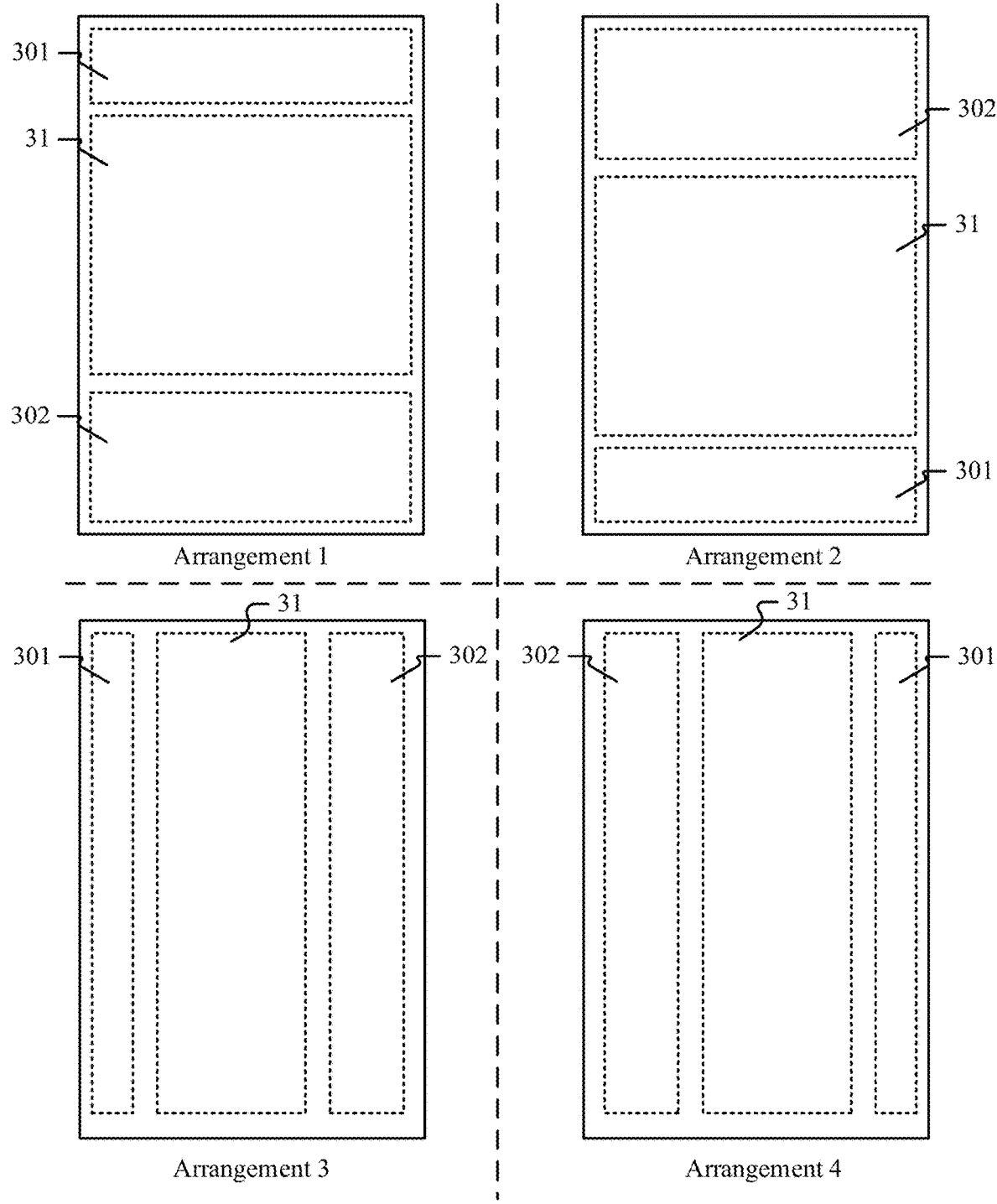
FIG. 3c is a schematic diagram of another arrangement of an object display region and an icon display region in a resource transmission interface according to an embodiment of the present disclosure.

In one embodiment, a region may be used to display the terminal identifier of the associated terminal and the session identifier of each of the at least one other session; and in one embodiment, the object display region 30 may be an undivided region. In this case, an arrangement of the object display region 30 and the icon display region 31 in the resource transmission interface may be shown in each figure in FIG. 3b. In another embodiment, because the terminal identifier of the associated terminal and the session identifier of the other session belong to different types of identifiers, the terminal identifier of the associated terminal and the session identifier of the other session may alternatively be displayed in a partition manner in the object display region 30. In one embodiment, the object display region 30 may include at least one of the following sub-regions: a first sub-region 301 and a second sub-region 302. Specifically, if the at least one transmission object includes the associated terminal, the object display region 30 includes the first sub-region 301; and if the at least one transmission object includes at least one other session, the object display region 30 includes the second sub-region 302. The first sub-region 301 is used for displaying the terminal identifier of the associated terminal, and the second sub-region 302 is used for displaying the session identifier of the at least one other session. In this case, if the object display region 30 includes only the first sub-region 301 or the second sub-region 302, the arrangement of the first sub-region 301 (or the second sub-region 302) and the icon display region 31 in the resource transmission interface is similar to the arrangement shown in FIG. 3c. If the object display region 30 includes both the first sub-region 301 and the second sub-region 302, the arrangement of the first sub-region 301, the second sub-region 302, and the icon display region 31 in the resource transmission interface may be shown in FIG. 3c. It is to be understood that each of FIG. 3b and FIG. 3c merely exemplarily lists several arrangements, which are not exhaustive.

Figure 3D:
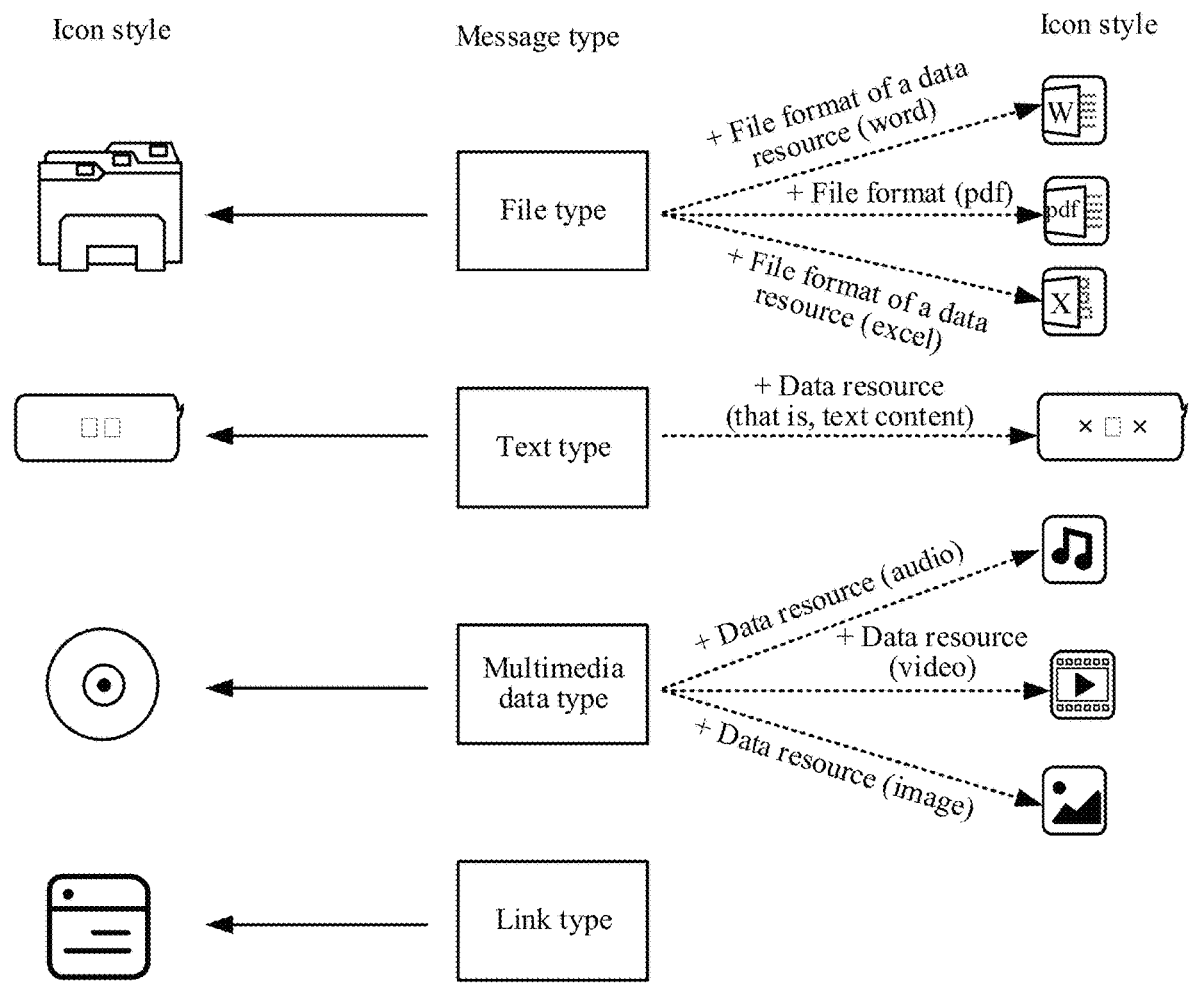
FIG. 3d is a diagram of a correspondence between an icon style of a message icon and a message parameter according to an embodiment of the present disclosure.

The icon display region 31 may include a message icon 34 corresponding to the target message, and the icon style of the message icon 34 may be a system default style preset according to service requirements; alternatively, the icon style of the message icon 34 may be determined according to a message parameter of the target message. Specifically, the message parameter may include at least: a message type of the target message. The message type of the target message herein may be: a file type, a text type, a multimedia data type, or a link type. In this case, the icon style of the message icon 34 may be determined according to the message type. As shown in FIG. 3d, if the message type is a file type, the icon style of the message icon 34 may be a document style; if the message type is a text type, the icon style of the message icon 34 may be a chat bubble style; if the message type is a multimedia data type, the icon style of the message icon 34 may be a multimedia style; and if the message type is a link type, the icon style of the message icon 34 may be a web page icon style. Furthermore, the message parameter may further include the data resource corresponding to the target message. In this case, the icon style of the message icon 34 may be determined according to the message type of the target message and the data resource corresponding to the target message. Still as shown in FIG. 3d, if the data resource corresponding to the target message is a file, different file formats correspond to different icon styles; for example, a word file format corresponds to a word icon style, a pdf file format corresponds to a pdf icon style, and an excel file format corresponds to an excel icon style. If the data resource corresponding to the target message is multimedia data, different multimedia data may also correspond to different icon styles; for example, a video corresponds to a video icon style, an audio corresponds to a music icon style, and an image corresponds to an image icon style. A display position of the message icon 34 in the icon display region 31 may be preset according to service requirements; or may be determined in real time according to an input position of the trigger operation on the target message in the terminal screen, which is not limited.

Figure 3E:
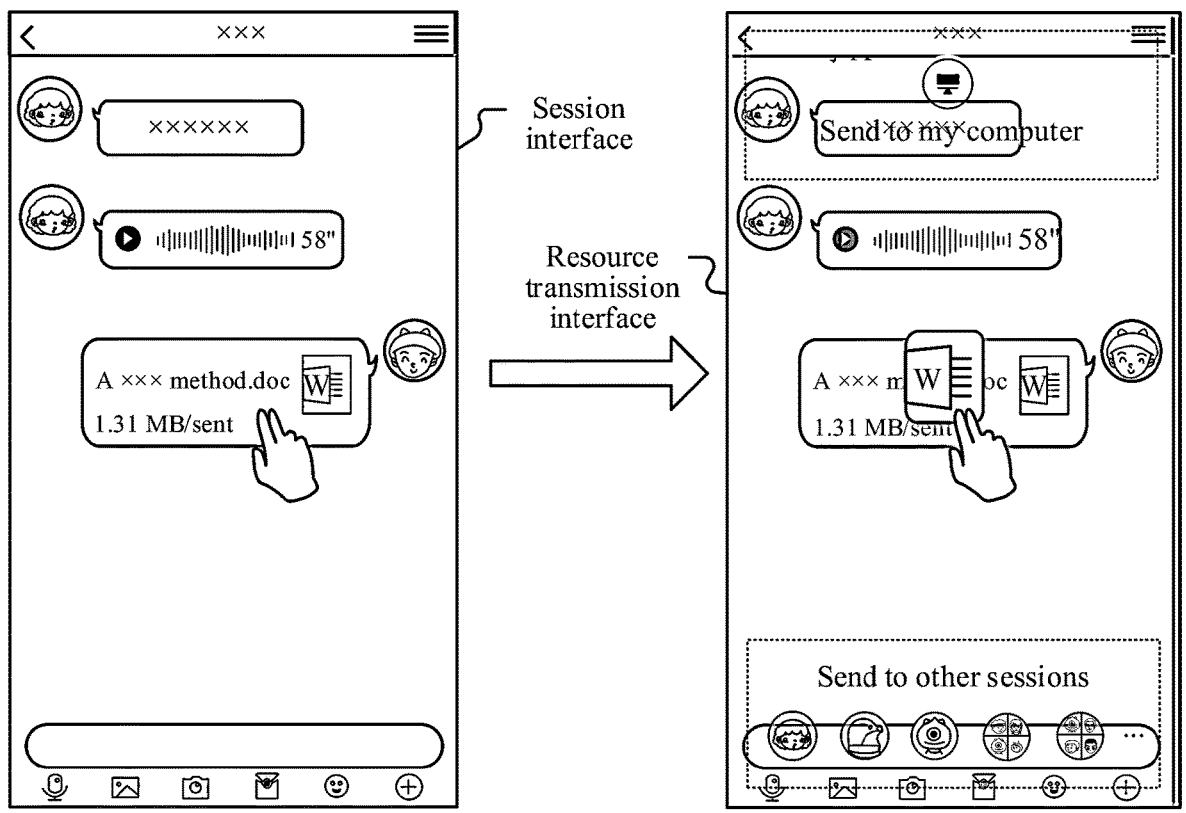
FIG. 3e is a schematic diagram of an output of a resource transmission interface according to an embodiment of the present disclosure.
Figure 3F:
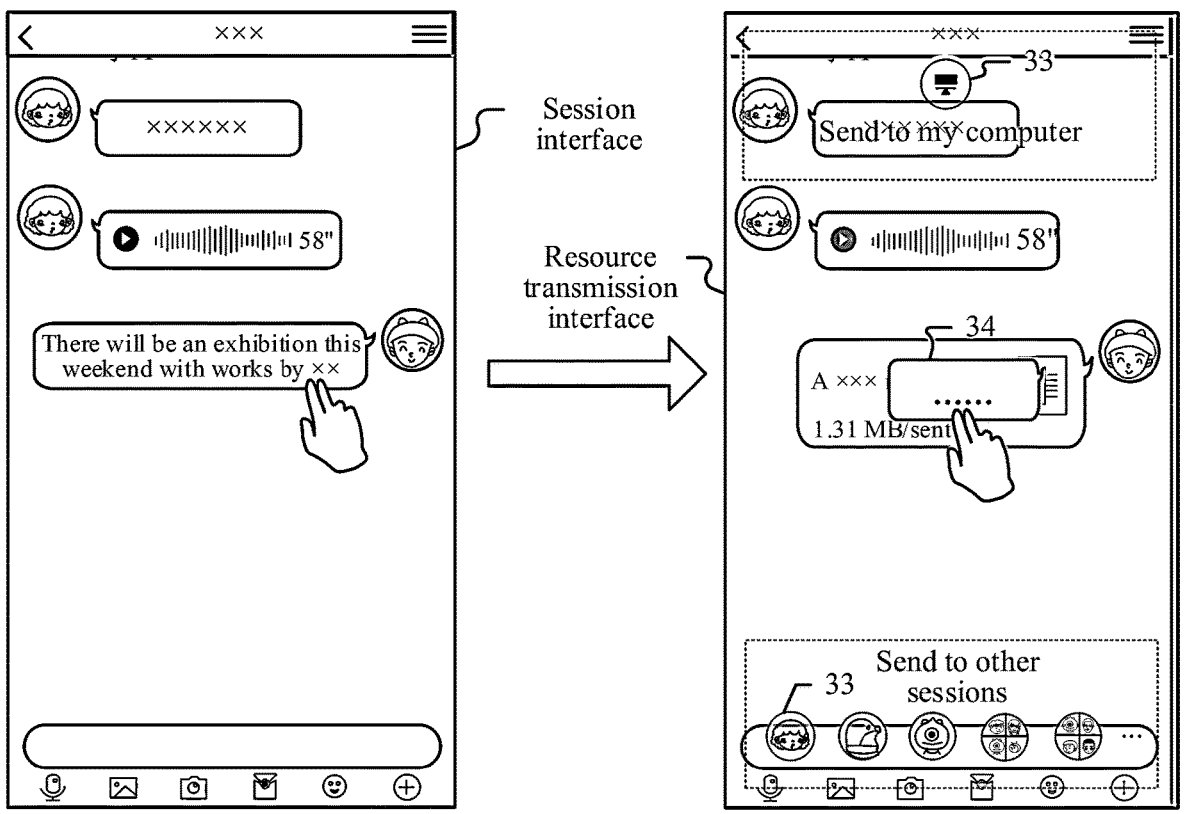
FIG. 3f is a schematic diagram of an output of another resource transmission interface according to an embodiment of the present disclosure.
Figure 3G:
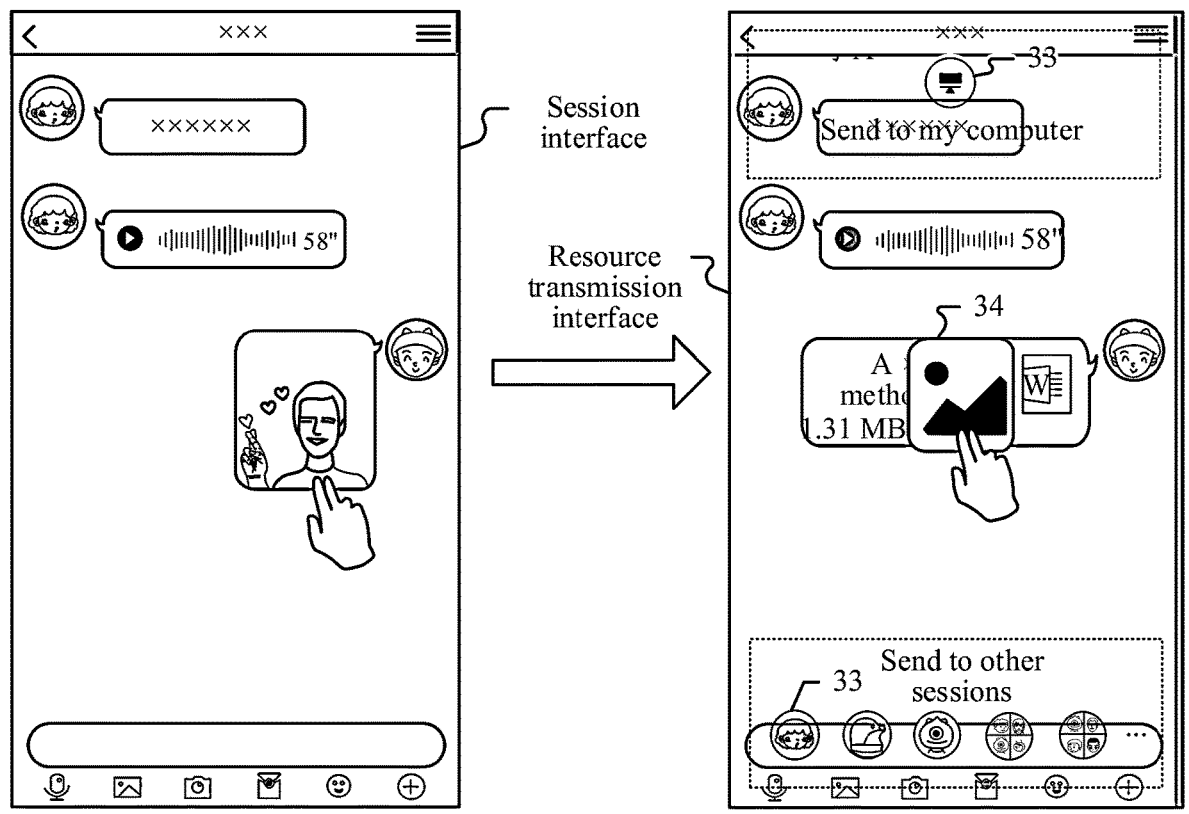
FIG. 3g is a schematic diagram of an output of still another resource transmission interface according to an embodiment of the present disclosure.
Figure 3H:
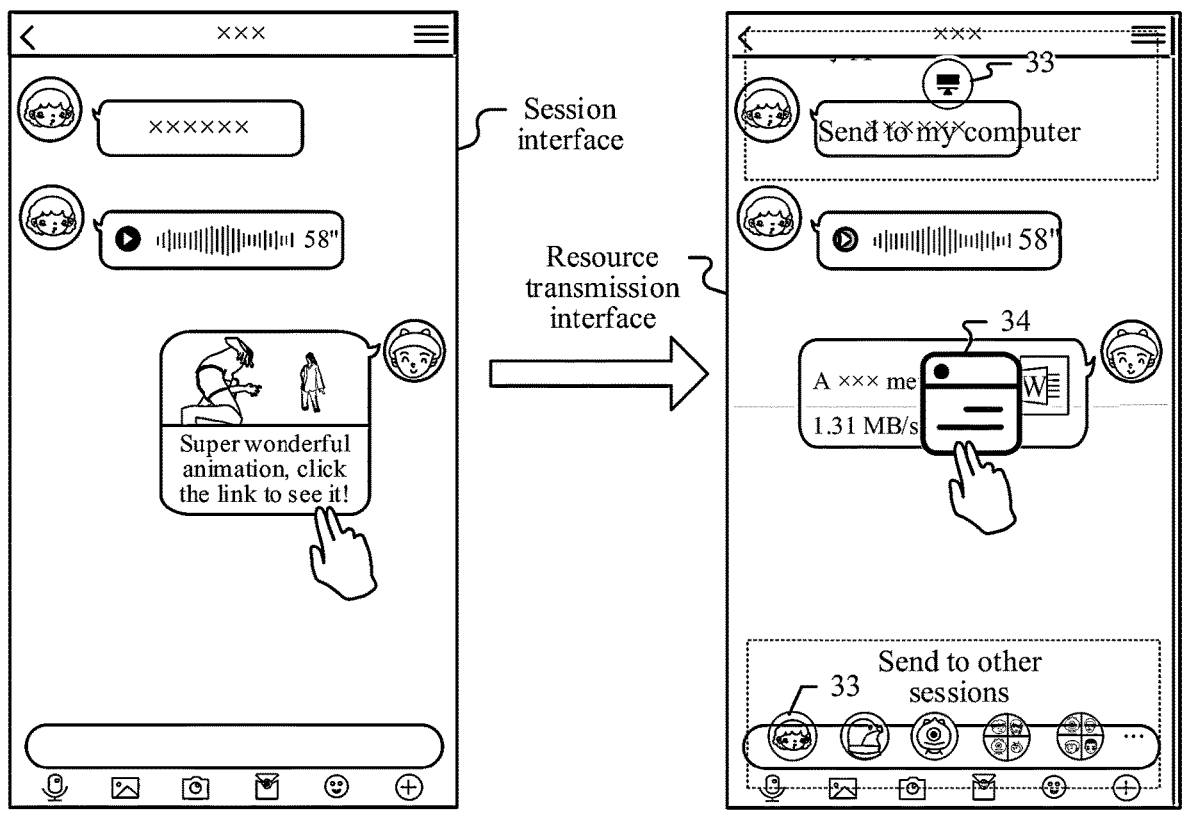
FIG. 3h is a schematic diagram of an output of yet another resource transmission interface according to an embodiment of the present disclosure.

Based on the above description, using an example in which the at least one transmission object includes the associated terminal and the at least one other session, that is, the object display region 30 includes both the first sub-region 301 and the second sub-region 302, when the target message is a file message, that is, the message type of the target message is a file type, a schematic diagram of an output of the resource transmission interface by the target terminal may be shown in FIG. 3e. When the target message is a text message, that is, the message type of the target message is a text type, a schematic diagram of an output of the resource transmission interface by the target terminal may be shown in FIG. 3f. When the target message is a multimedia data message (for example, an image message), that is, the message type of the target message is a multimedia data type (for example, an image type), a schematic diagram of an output of the resource transmission interface by the target terminal may be shown in FIG. 3g. When the target message is a link message, that is, the message type of the target message is a link type, a schematic diagram of an output of the resource transmission interface by the target terminal may be shown in FIG. 3h. It is to be understood that each of FIG. 3e to FIG. 3h merely exemplarily represents a schematic diagram of the resource transmission interface, which is not limited.

S203: Move a message icon from the icon display region to the object display region according to a moving operation on the message icon.

Figure 3I:
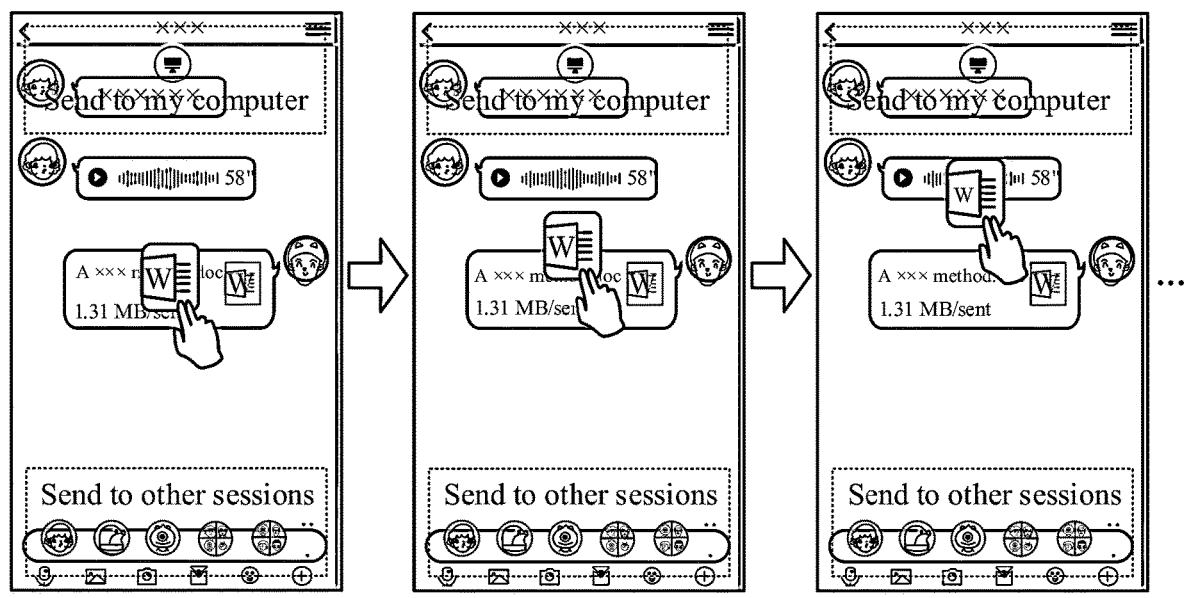
FIG. 3i is a schematic diagram of a movement of a message icon according to an embodiment of the present disclosure.

As can be seen from the above, the message icon is a movable operation control. Therefore, the user may perform a moving operation on the message icon, to move the message icon from the icon display region to the object display region. In one embodiment, the target user may hold (e.g., continuously press) and drag the message icon through a finger or an external device (for example, a mouse), to move the message icon; that is, the moving operation may be an operation of continuously pressing and dragging the message icon. Then, in one embodiment, the target terminal may move the message icon from the icon display region to the object display region along a track of the message icon dragged by the target user. Using an example in which the target user drags the message icon to the first sub-region in the object display region, a schematic diagram of a movement of the message icon may be shown in FIG. 3i.

Figure 3J:
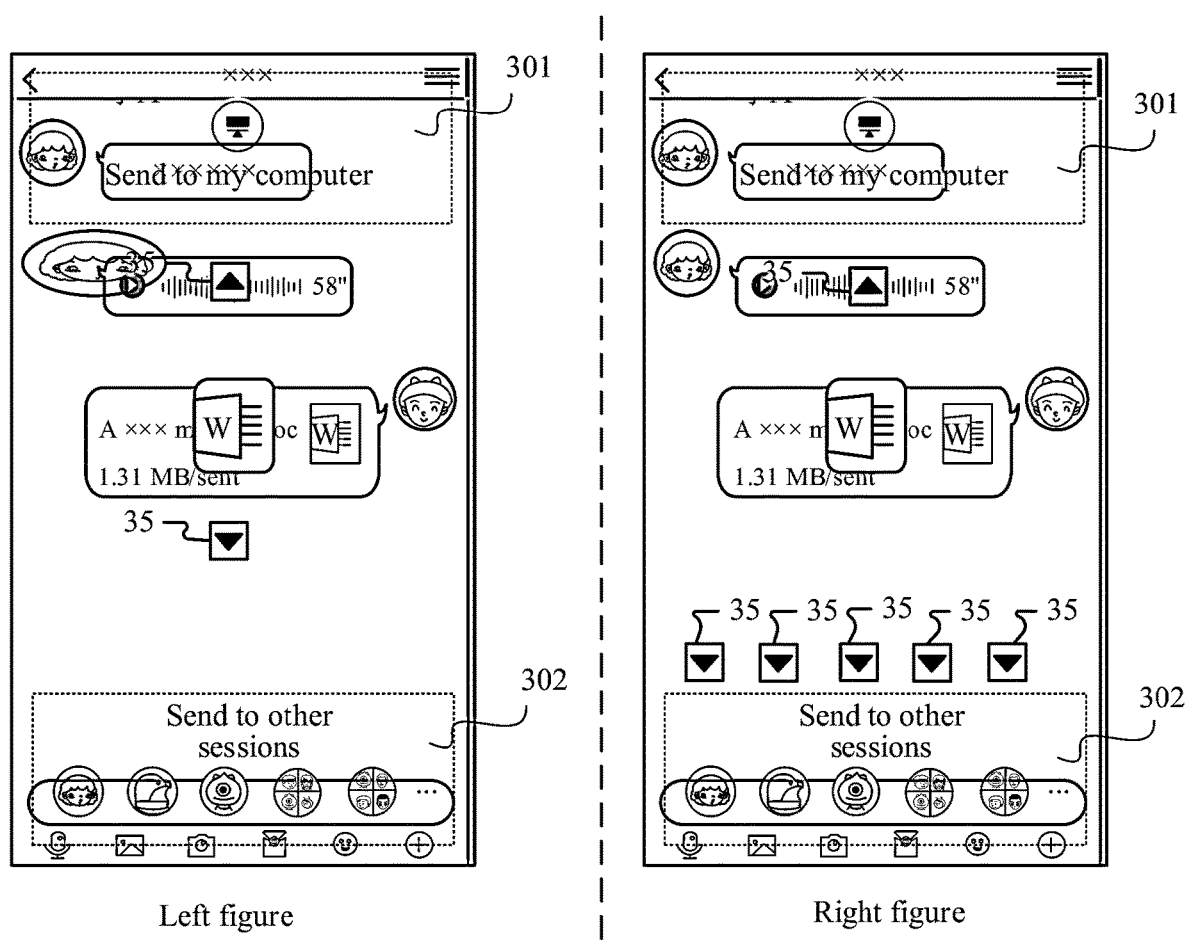
FIG. 3j is a schematic diagram of a shortcut movement button according to an embodiment of the present disclosure.
Figure 3K:
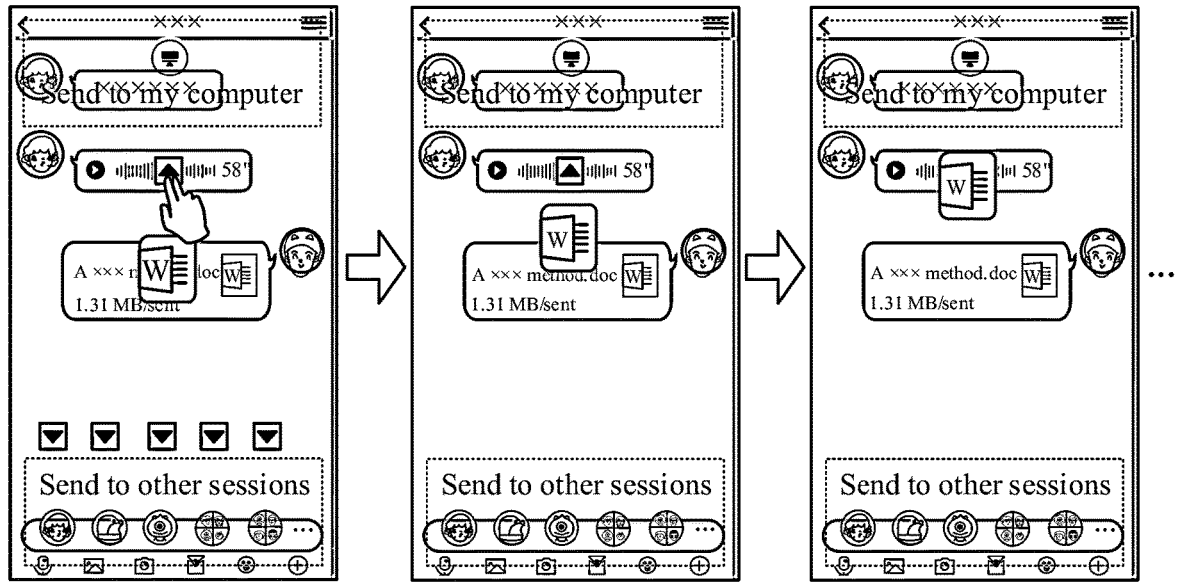
FIG. 3k is a schematic diagram of a movement of another message icon according to an embodiment of the present disclosure.

In another embodiment, the target terminal may provide one or more shortcut movement buttons 35 for the target user in the icon display region, and each shortcut movement button 35 may correspond to a movement direction. In one embodiment, the number of shortcut movement buttons 35 may be determined according to the number of regions involved in the object display region 30. If the object display region 30 is an undivided region, the number of shortcut movement buttons 35 may be one; and the movement direction corresponding to this shortcut movement button 35 is the movement direction from the icon display region to the object display region. If the object display region 30 includes the first sub-region 301 and the second sub-region 302, the number of shortcut movement buttons 35 may be two. As shown in the left figure of FIG. 3j, the movement direction corresponding to one shortcut movement button 35 is the movement direction from the icon display region to the first sub-region 301, and the movement direction corresponding to the other shortcut movement button 35 is the movement direction from the icon display region to the second sub-region 302. In another embodiment, the number of shortcut movement buttons 35 may be determined according to the number of object identifiers included in the object display region 30. For example, if the object display region 30 includes a total of six object identifiers, namely one terminal identifier of the associated terminal and five session identifiers of the other sessions, the number of shortcut movement buttons 35 is 6, and one shortcut movement button 35 is associated with one object identifier. As shown in the right figure of FIG. 3j, the movement direction corresponding to any shortcut movement button 35 is the movement direction from the icon display region to a display position of the object identifier associated with the any shortcut movement button 35. Correspondingly, the target user may select a target shortcut movement button from the at least one shortcut movement button through a finger or an external device (for example, a mouse), and perform a trigger operation on the target shortcut movement button to move the message icon; that is, the moving operation may be a trigger operation on the target shortcut movement button. Then, in one embodiment, as shown in FIG. 3k, the target terminal may move the message icon from the icon display region to the object display region 30 along the movement direction corresponding to the target shortcut movement button.

S204: Transmit, in response to the message icon being moved to the object display region, the data resource corresponding to the target message to a target transmission object in the object display region, the target transmission object being determined from the at least one transmission object in the object display region according to a position of an end point of a movement track of the message icon.

Figure 3L:
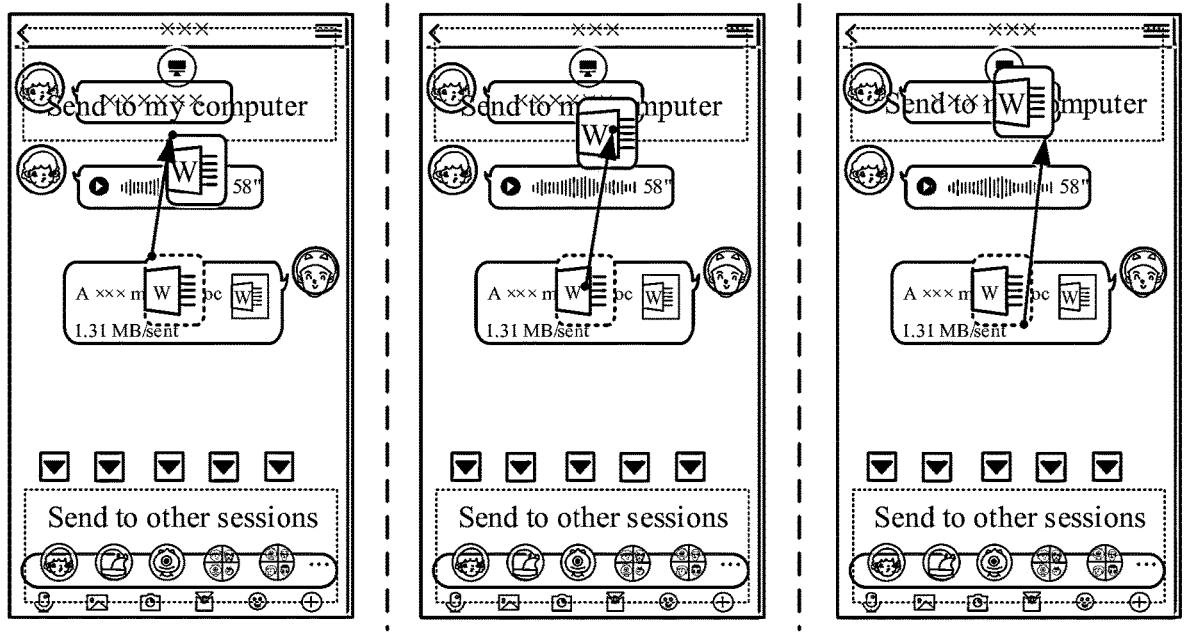
FIG. 3l is a schematic diagram of a movement track of a message icon according to an embodiment of the present disclosure.

The message icon being moved to the object display region means that the end point of the movement track of the message icon is located in the object display region. The movement track of the message icon mentioned herein may be understood as a movement track of a reference point of the message icon. The reference point may be any point of the message icon, such as an upper left point, a center point, or a lower right point of the message icon. Correspondingly, the movement track of the message icon may be shown in FIG. 3l. As can be seen from each movement track shown in FIG. 3l, when the end point of the movement track of the message icon is located in the object display region, the entire message icon may be located in the object display region, or a part of the message icon may be located in the object display region, which is not limited in this embodiment of the present disclosure.

In response to detecting that the message icon is moved to the object display region, the target terminal may transmit the data resource corresponding to the target message to the target transmission object (also referred to as the target object) indicated by a target object identifier. The target object identifier is determined from the object display region according to the position of the end point of the movement track of the message icon. Specifically, if the object display region is an undivided region, the target object identifier may be the object identifier corresponding to the position of the end point of the movement track. In an example, if the position of the end point of the movement track is the display position of the terminal identifier in the object display region, the object identifier corresponding to the position of the end point of the movement track is the terminal identifier, that is, the target object identifier is the terminal identifier. In another example, if the position of the end point of the movement track is the display position of a session identifier x in the object display region, the object identifier corresponding to the position of the end point of the movement track is the session identifier x, that is, the target object identifier is the session identifier x. If the object display region includes the first sub-region and/or the second sub-region, when the end point of the movement track is located in the first sub-region, the target object identifier is the terminal identifier of the associated terminal, that is, the target object is the associated terminal; and when the end point of the movement track is located in the second sub-region, the target object identifier is the session identifier of the target session in the at least one other session, that is, the target object is the target session in the at least one other session. The target session satisfies the following condition: a distance between the display position of the session identifier of the target session and the position of the end point of the movement track is less than or equal to a distance threshold. It is to be understood that, when the target object is a session of the at least one other session, the above-mentioned transmission of the data resource corresponding to the target message to the target object is essentially the transmission of the data resource corresponding to the target message to the terminal of each user in the session.

The example embodiment of transmitting the data resource corresponding to the target message to the target object may be as follows: If the data resource corresponding to the target message is a text content, multimedia data, or a link, the target terminal may send a first data transmission request carrying the text content, multimedia data, or link to a server, so as to request the server to directly deliver the text content, multimedia data, or link carried by the first data transmission request to the target object. If the data resource corresponding to the target message is a file, the target terminal may send a second data transmission request carrying file information (for example, file identifier or file download address) of the file to the server, so as to request the server to directly deliver the file to the target object according to the file information; or to request the server to deliver a transmission notification to the target object according to the file information, to instruct the target object to download the file, and deliver the file to the target object after receiving a download request sent by the target object based on the transmission notification. The file may be a local file stored in a local space of the target terminal, or a cloud file that has not been downloaded to the local space of the target terminal (that is, a file stored in the server), which is not limited in this embodiment of the present disclosure.

In this embodiment of the present disclosure, after the target message in the session interface is triggered, the resource transmission interface may be directly outputted. The object display region in the resource transmission interface includes the object identifier of the at least one transmission object, and the icon display region in the resource transmission interface includes the message icon corresponding to the target message. By outputting the resource transmission interface, the user may trigger the terminal to determine the target object from the at least one transmission object according to the end point of the movement track of the message icon and transmit the data resource corresponding to the target message to the target object only by moving the message icon from the icon display region to the object display region. In this way, the user operation process of the resource transmission can be effectively simplified, and the efficiency of the resource transmission can be improved.

Figure 4:
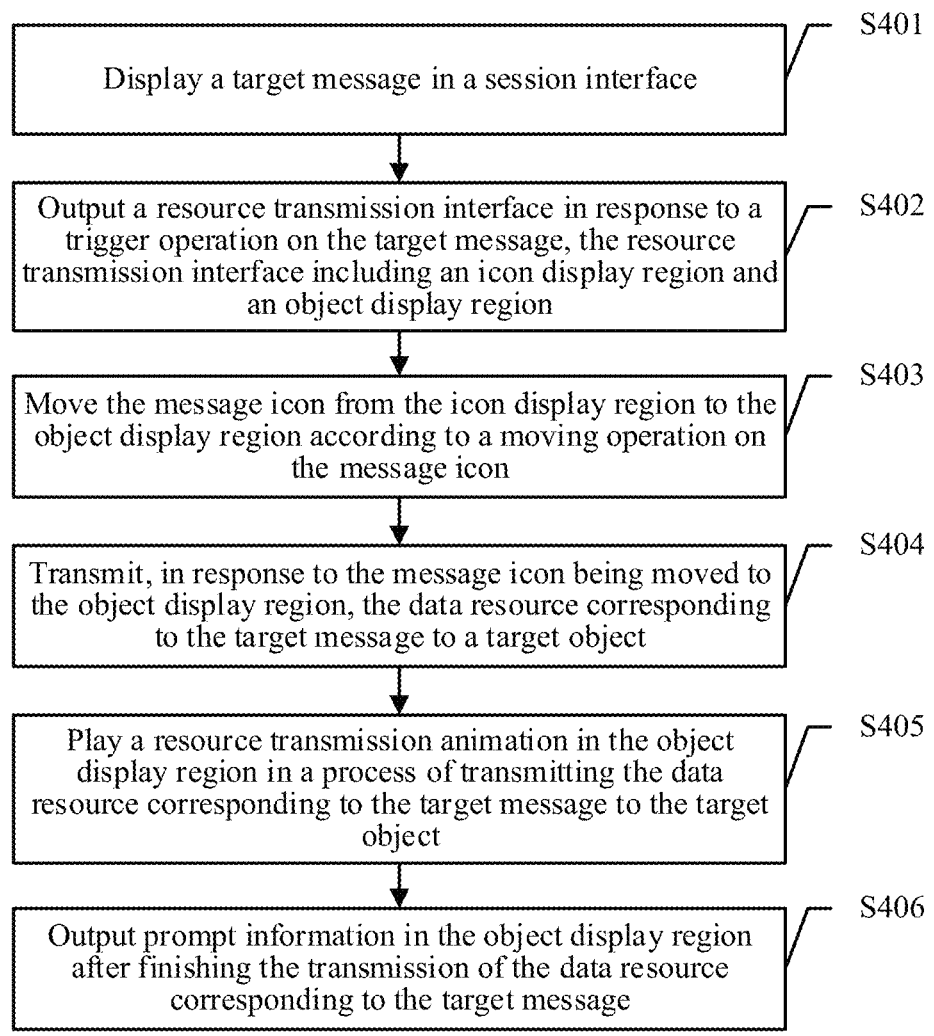
FIG. 4 is a schematic flowchart of a data transmission method according to another embodiment of the present disclosure.

Based on the foregoing description, an embodiment of the present disclosure provides another more specific data transmission method. For ease of description, this embodiment of the present disclosure is still described using an example in which the data transmission method is performed by a target terminal, and the moving operation is the operation of continuously pressing and dragging the message icon. Referring to FIG. 4, the data transmission method may include the following steps S401 to S406:

S401: Display a target message in a session interface of a target session, the target message being corresponding to a data resource.

S402: Output a resource transmission interface in response to a trigger operation on the target message. The resource transmission interface includes an object display region and an icon display region; and the object display region includes an object identifier of at least one transmission object, and the icon display region includes a message icon corresponding to the target message. In an embodiment of the present disclosure, the description is performed mainly using an example in which the object identifier of the at least one transmission object includes a terminal identifier of the associated terminal and a session identifier of the at least one other session; that is, the object display region mentioned in the embodiments of the present disclosure includes a first sub-region and a second sub-region.

S403: Move the message icon from the icon display region to the object display region according to a moving operation on the message icon.

For the example embodiment of steps S401 to S403 mentioned in this embodiment of the present disclosure, reference may be made to the related description of steps S201 to S203 in the foregoing embodiment of the present disclosure, which is not repeated herein again.

Figure 5A:
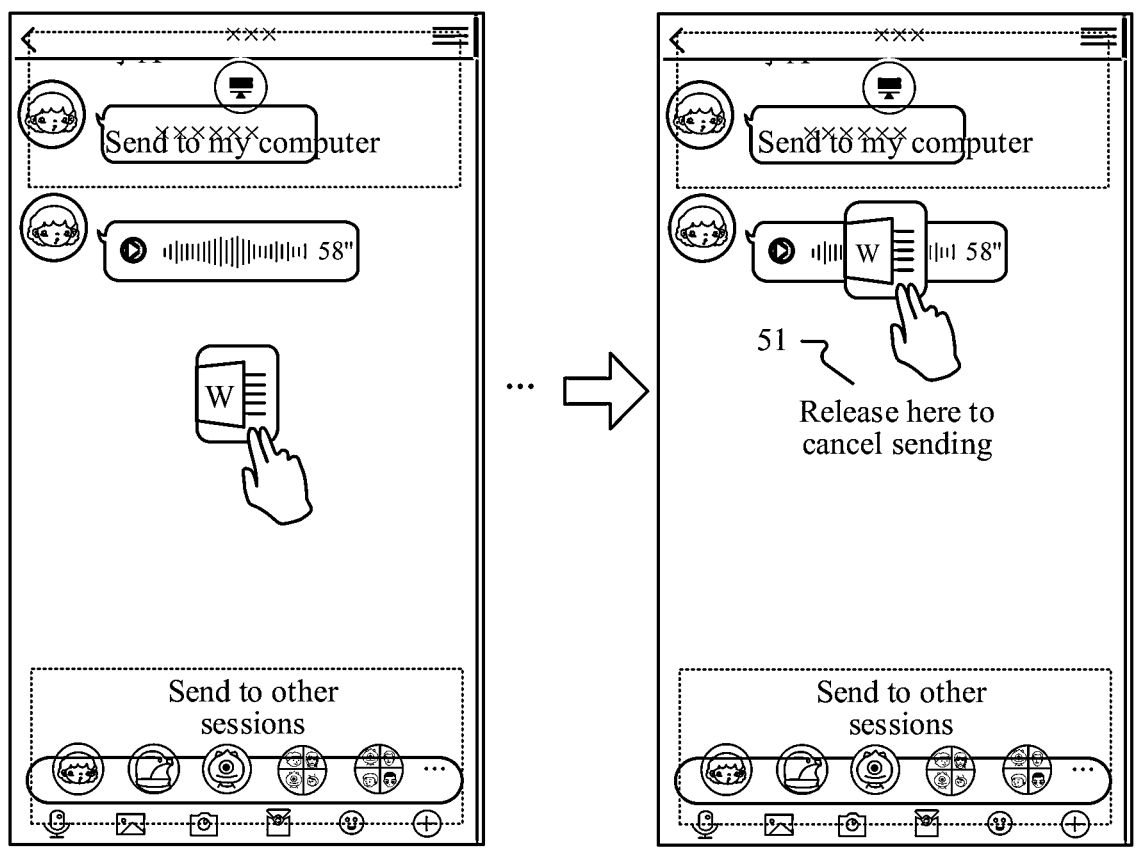
FIG. 5a is a schematic diagram of displaying a first prompt in an icon display region according to an embodiment of the present disclosure.

In one embodiment, the target terminal may further display a first prompt in the icon display region in a process of moving the message icon to the object display region. The first prompt is used for prompting that when a pressing operation on the message icon is canceled in the icon display region, transmission of the data resource corresponding to the target message is canceled. For example, the first prompt may be "release here to cancel sending". Then, correspondingly, a schematic diagram of displaying a first prompt 51 in the icon display region may be shown in FIG. 5*a*.

Figure 5B:
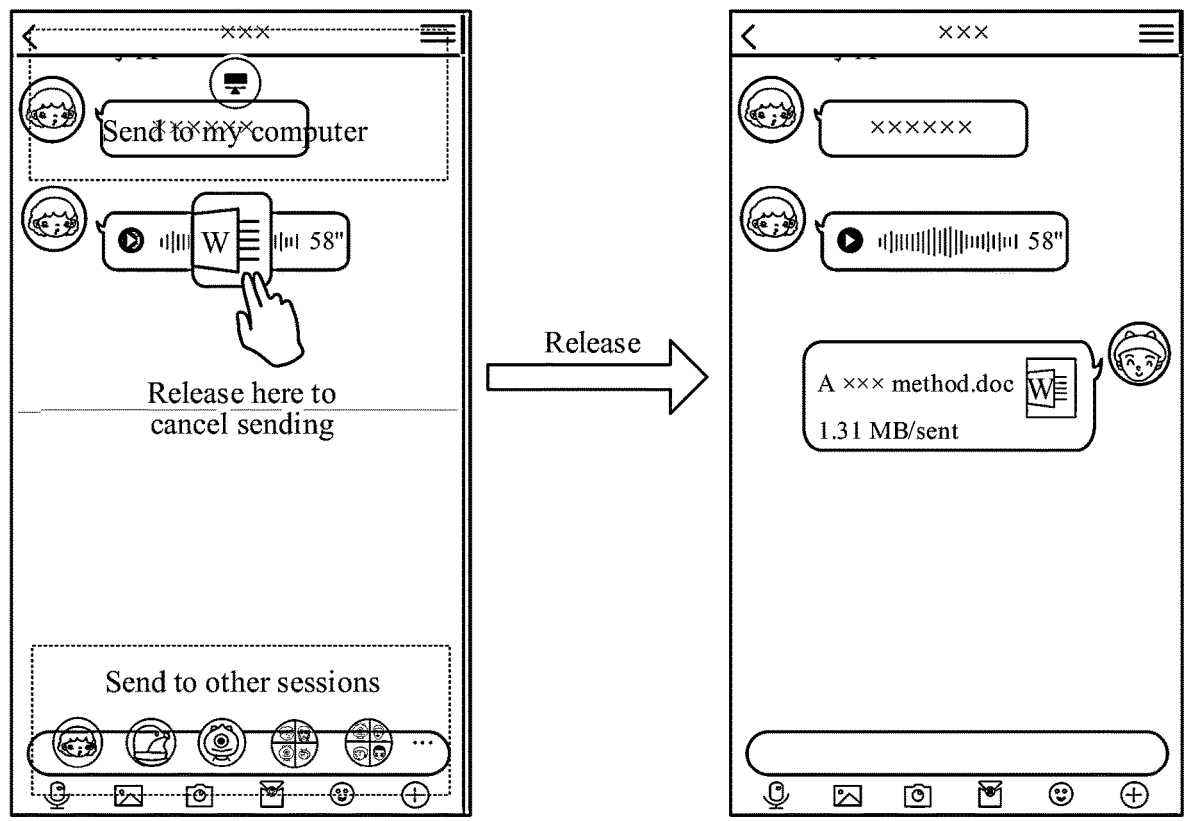
FIG. 5b is a schematic diagram of returning from a resource transmission interface to a session interface according to an embodiment of the present disclosure.

In another embodiment, when the pressing operation on the message icon is canceled in the icon display region, the target terminal returns from the resource transmission interface to the session interface. For example, if the target user releases the message icon after the message icon is moved for a short distance, it may be considered that the pressing operation on the message icon is canceled in the icon display region. In this case, the target terminal may return from the resource transmission interface to the session interface, as shown in FIG. 5*b*.

S404: Transmit, in response to the message icon being moved to the object display region, the data resource corresponding to the target message to a target transmission object in the object display region, the target transmission object being determined from the at least one transmission object in the object display region according to a position of an end point of a movement track of the message icon.

Figure 5C:
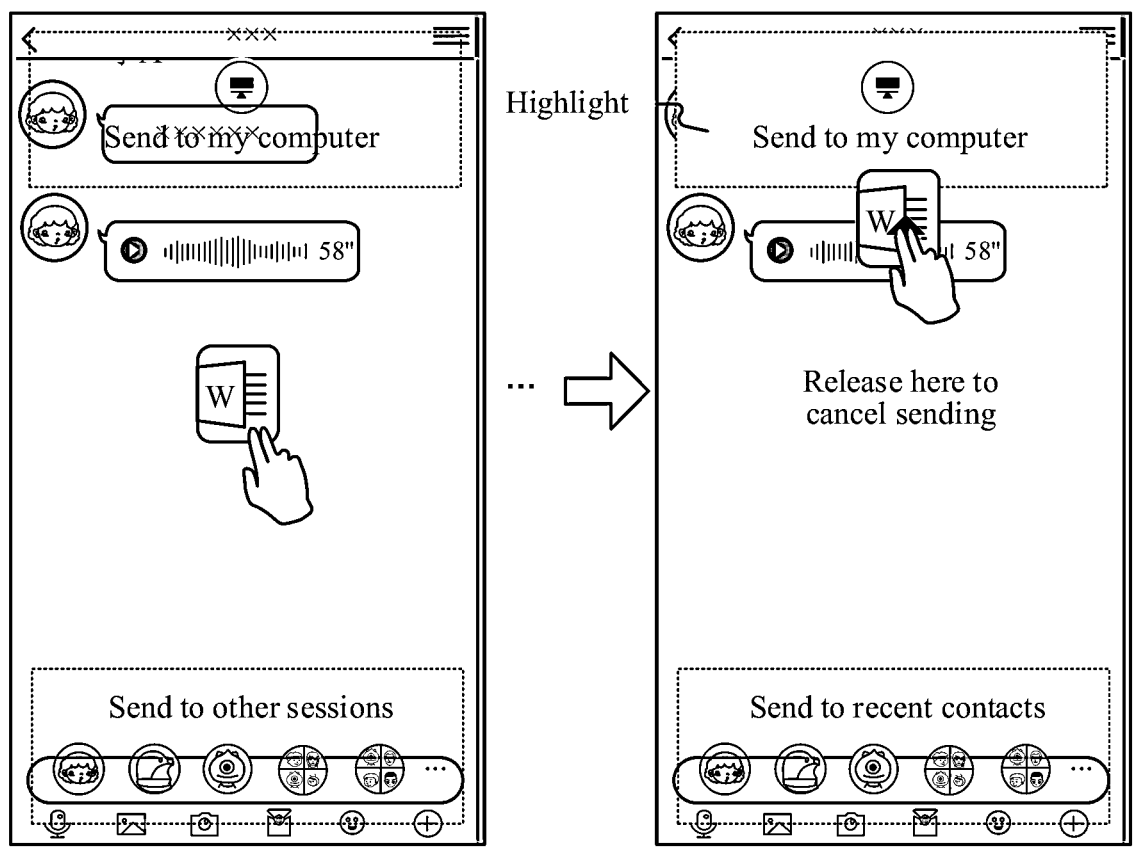
FIG. 5c is a schematic diagram of a case of highlighting a sub-region where a message icon is located according to an embodiment of the present disclosure.

In one embodiment, when the message icon is moved to the object display region, the target terminal may further highlight the sub-region where the message icon is located. By highlighting the sub-region where the message icon is located, the target user may be intuitively prompted that the message icon is moved to the object display region. Specifically, a schematic diagram in which if the sub-region where the message icon is located is the first sub-region, the first sub-region is highlighted may be shown in FIG. 5*c*; and a schematic diagram in which if the sub-region where the message icon is located is the second sub-region, the second sub-region is highlighted may be shown in FIG. 5*d*.

Figure 5D:
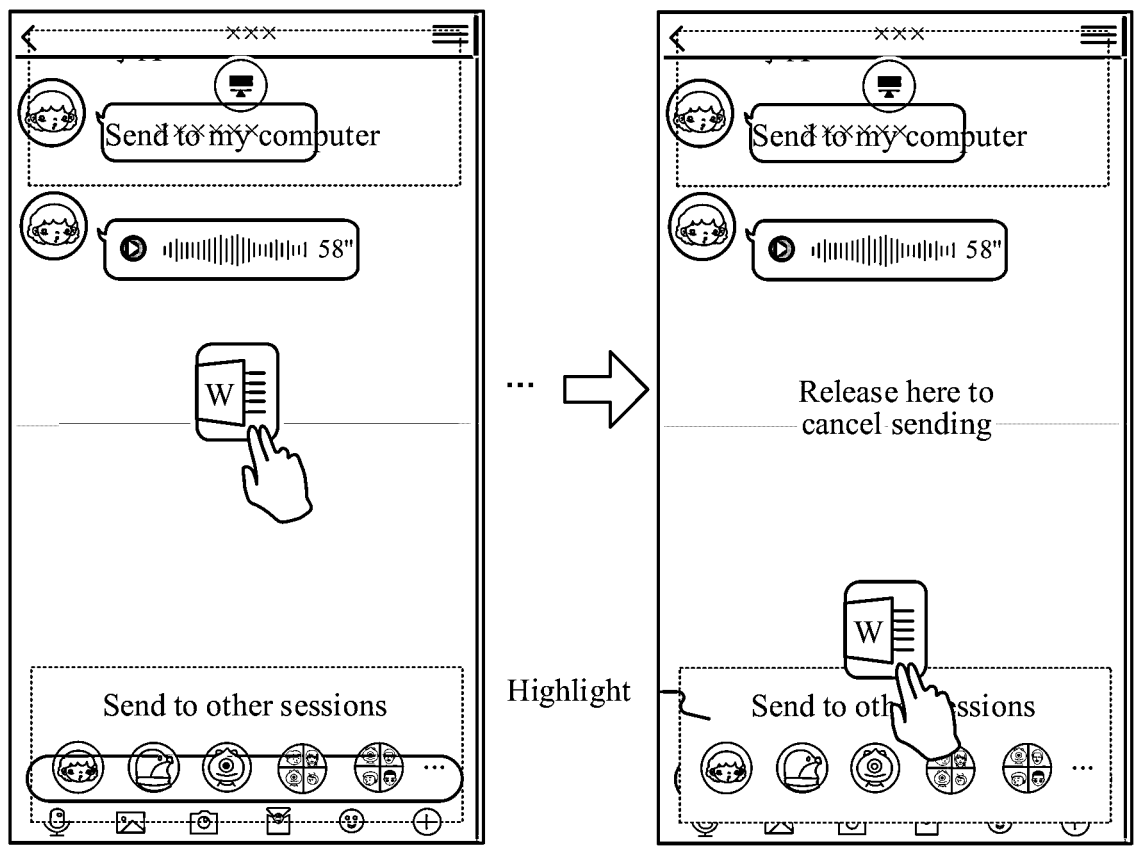
FIG. 5d is a schematic diagram of another case of highlighting a sub-region where a message icon is located according to an embodiment of the present disclosure.
Figure 5E:
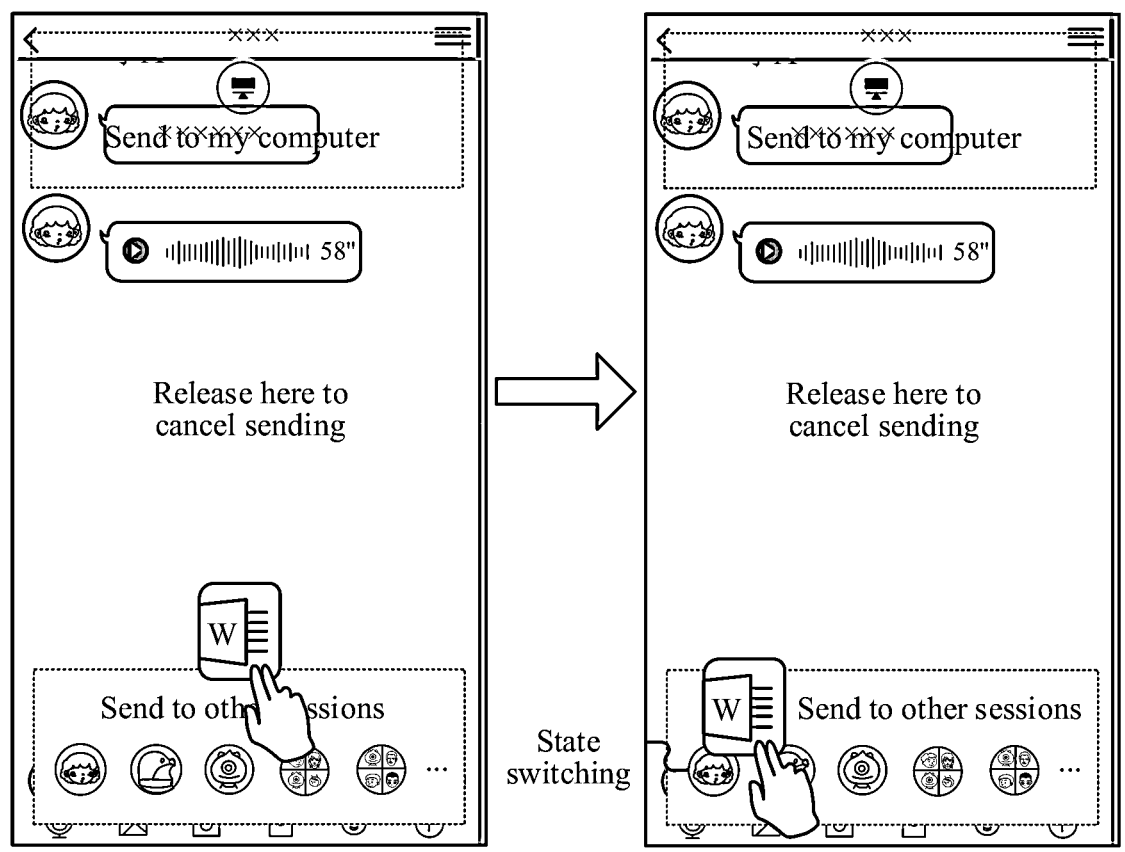
FIG. 5e is a schematic diagram of switching a state of a session identifier of another session according to an embodiment of the present disclosure.

In another embodiment, if the sub-region where the message icon is located is the second sub-region, when the target terminal highlights the sub-region where the message icon is located, the target terminal may further synchronously update a display state of the session identifier of each of the at least one other session in the second sub-region to a to-be-selected state (a gray state shown in FIG. 5d). In this case, the target user may move the message icon to the display position of the session identifier of one of the at least one other session to select the target session. Correspondingly, when the message icon is moved to the display position of the session identifier of one of the at least one other session, the target terminal may switch the display state of the session identifier of the one of the at least one other session from the to-be-selected state to a selected state. For example, as shown in FIG. 5e, when the message icon is moved to a display position of a first session identifier, the target terminal may switch a display state of the first session identifier from the to-be-selected state (for example, a gray state) to the selected state (for example, a white state). If the target user controls the movement of the message icon through a finger or an external device (for example, a mouse), the target user may drag the message icon back and forth a plurality of times among the display positions of the session identifiers of the other sessions to switch to select the session identifier, so as to ultimately select the target session (that is, the target transmission object or the target object). Correspondingly, in the process of dragging the message icon back and forth by the target user, the target terminal may continue drawing the movement track of the message icon, and finish drawing the movement track after detecting that the pressing operation on the message icon is canceled. Then, the target object is determined according to the end point of the movement track.

Figure 5F:
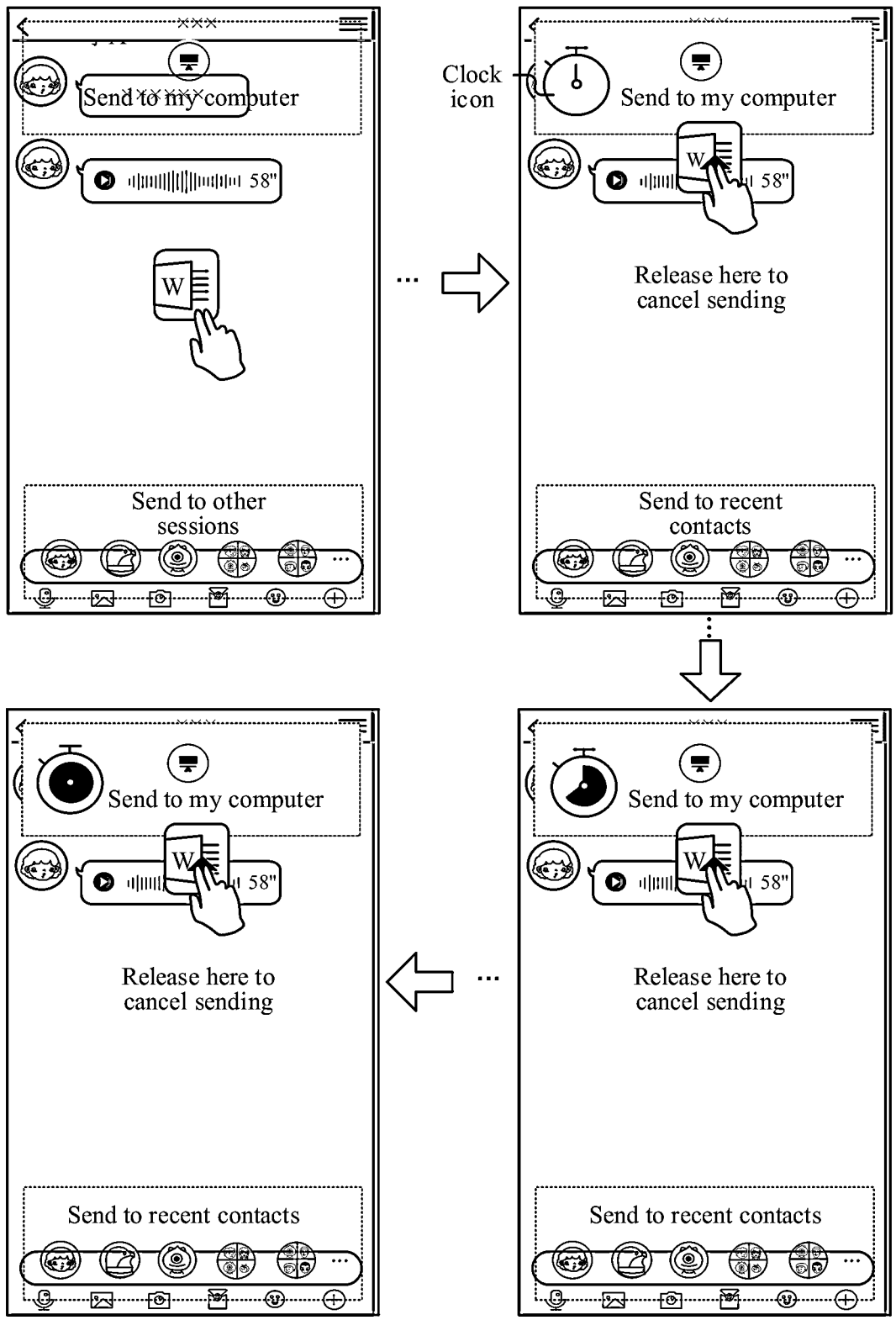
FIG. 5f is a schematic diagram of playing a transmission indication animation according to an embodiment of the present disclosure.

In still another embodiment, in order to avoid erroneous resource transmission caused by accidentally moving the message icon to the object display region by the target user, after detecting that the message icon is located in the object display region, the target terminal may further detect whether a stay duration of the message icon in the object display region is greater than a duration threshold (for example, 3 seconds). If the stay duration is greater than the duration threshold, the target terminal performs the step of transmitting the data resource corresponding to the target message to the target object indicated by the target object identifier. That is, in one embodiment, the target user still needs to continue pressing the message icon after dragging the message icon to the object display region, and the target terminal can be triggered to transmit the data resource only after waiting until a pressing duration is greater than the duration threshold. Furthermore, in order to improve the interest of the target user in pressing the message icon and intuitively reflect a remaining duration for which the target user needs to wait, the target terminal may further play a transmission indication animation in the object display region according to the pressing duration for which the message icon is pressed in the object display region. The transmission indication animation indicates the remaining duration to wait until the transmission of the data resource corresponding to the target message; and a total playing duration of the transmission indication animation may be equal to the duration threshold. Specifically, the transmission indication animation may include at least the following example embodiments:

Example embodiment 1: The transmission indication animation may be an animation in which countdown is performed in a clock icon. In one embodiment, when the target terminal plays the transmission indication animation in the object display region according to the pressing duration for which the message icon is pressed in the object display region, the target terminal may dynamically control a pointer rotation in the clock icon in real time according to a change of the pressing duration for which the message icon is pressed in the object display region. For example, if the message icon is located in the first sub-region, a schematic diagram of playing the transmission indication animation may be shown in FIG. 5f.

Figure 5G:
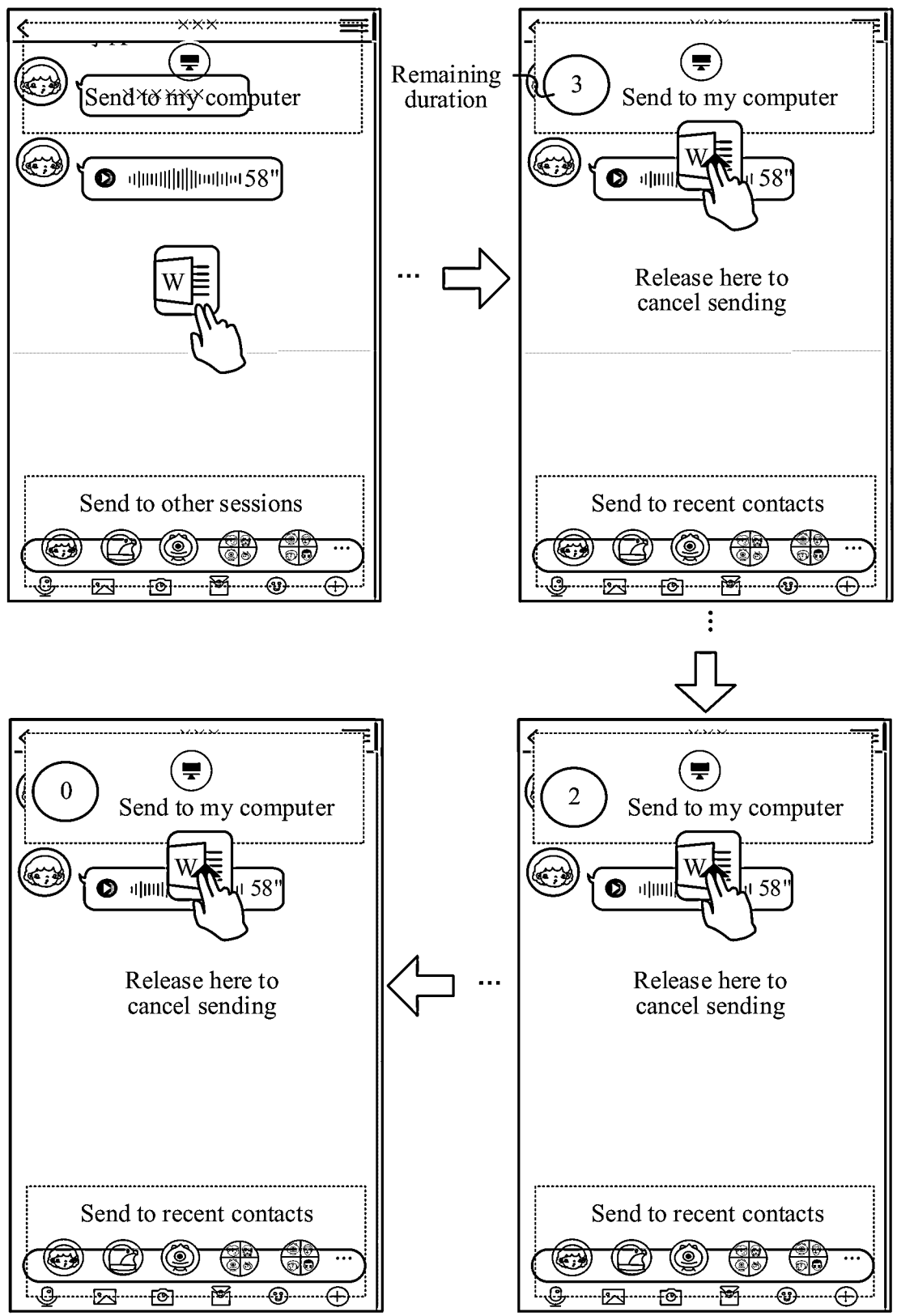
FIG. 5g is a schematic diagram of playing another transmission indication animation according to an embodiment of the present disclosure.

Example embodiment 2: The transmission indication animation may alternatively be a digital change animation of countdown. In one embodiment, when the target terminal plays the transmission indication animation in the object display region according to the pressing duration for which the message icon is pressed in the object display region, the target terminal may calculate the remaining duration in real time according to the pressing duration for which the message icon is pressed in the object display region, and dynamically display the remaining duration in the object display region. For example, if the message icon is still located in the first sub-region, a schematic diagram of playing the transmission indication animation may be shown in FIG. 5g.

Figure 5H:
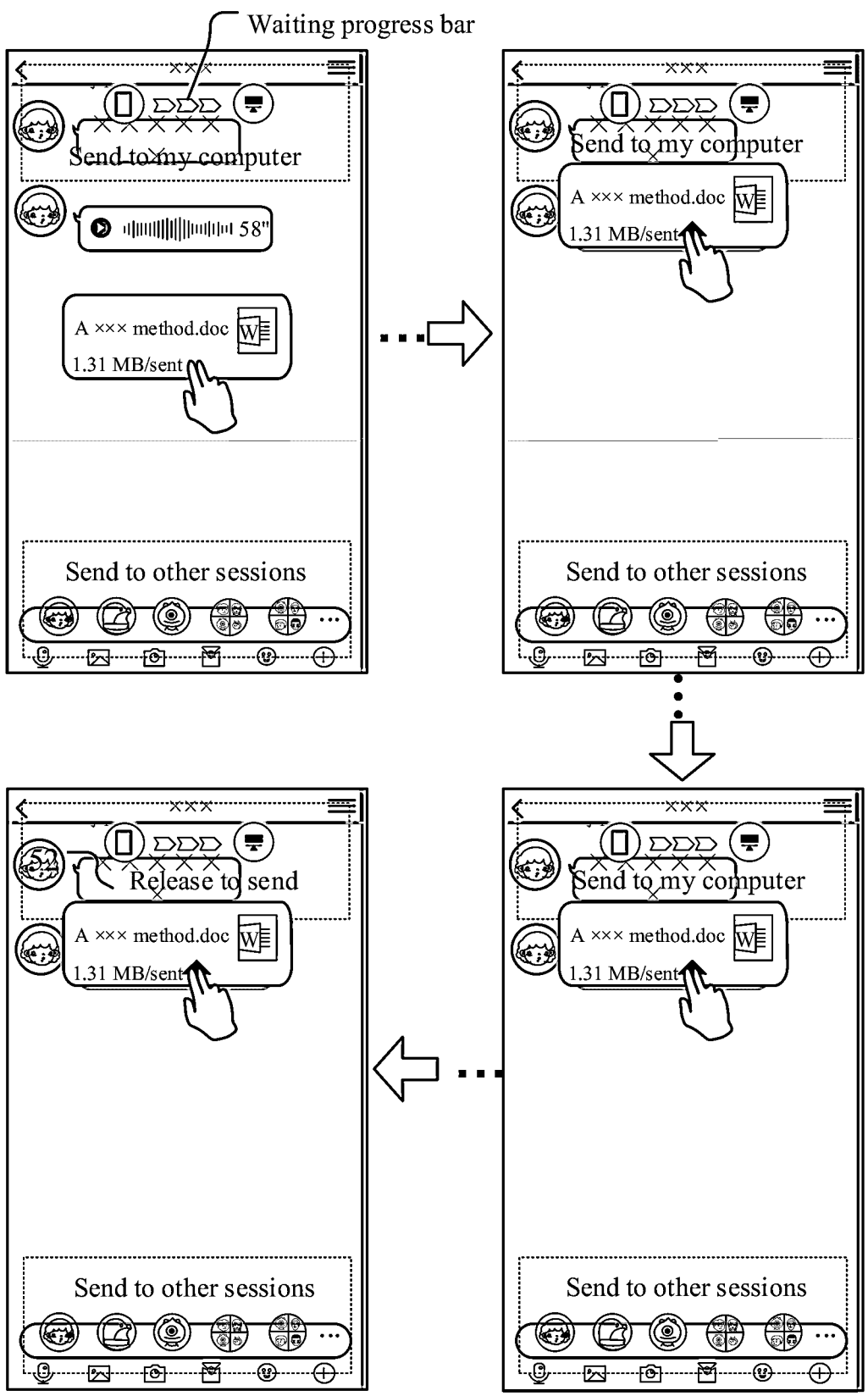
FIG. 5h is a schematic diagram of playing still another transmission indication animation according to an embodiment of the present disclosure.

Example embodiment 3: The object display region further includes a waiting progress bar including a plurality of sub-progress bars. A display state of each sub-progress bar is a first state, and a sub-progress bar corresponds to a duration interval. Then, the transmission indication animation may be an animation in which the display state of each sub-progress bar is sequentially switched from the first state to a second state. In one embodiment, when the target terminal plays the transmission indication animation in the object display region according to the pressing duration for which the message icon is pressed in the object display region, the target terminal may sequentially update the display state of each sub-progress bar in the waiting progress bar from the first state to the second state according to a change of the pressing duration for which the message icon is pressed in the object display region. The first state and the second state refer to two states with different display forms (for example, shapes or colors). Using an example in which the first state is a gray state and the second state is a white state, if the message icon is still located in the first sub-region, a schematic diagram of playing the transmission indication animation may be shown in FIG. 5h. This embodiment of the present disclosure merely exemplarily lists several product forms of the transmission indication animation, which are not exhaustive.

After finishing playing the transmission indication animation, the step of transmitting the data resource corresponding to the target message to the target object indicated by the target object identifier may be performed. If the transmission indication animation is the animation in which countdown is performed in the clock icon, the finishing playing the transmission indication animation means that a pointer in the clock icon rotates to zero. If the transmission indication animation is the digital change animation of countdown, the finishing playing the transmission indication animation means that the displayed remaining duration is zero. If the transmission indication animation is an animation in which the display state of each sub-progress bar is sequentially switched from the first state to the second state, the finishing playing the transmission indication animation means that the display state of each of all sub-progress bars in the waiting progress bar is the second state. In one embodiment, after the finishing playing the transmission indication animation, the target terminal may directly perform the step of transmitting the data resource corresponding to the target message to the target object indicated by the target object identifier. In another embodiment, after the finishing playing the transmission indication animation, the target terminal may output a second prompt in the object display region. The second prompt is used for prompting to cancel the pressing operation on the message icon, to transmit the data resource corresponding to the target message. For example, the second prompt may be "release to send". Then, correspondingly, a schematic diagram of displaying a second prompt 52 in the object display region may be shown in the last diagram in FIG. 5h. After seeing the second prompt, the target user may cancel pressing the message icon. Correspondingly, if the pressing operation on the message icon is canceled, the target terminal may perform the step of transmitting the data resource corresponding to the target message to the target object indicated by the target object identifier.

If the pressing operation on the message icon is canceled in the process of playing the transmission indication animation, that is, the pressing operation on the message icon is canceled before the finishing playing the transmission indication animation, the target terminal may directly return from the resource transmission interface to the session interface, to cancel the transmission of the data resource corresponding to the target message.

S405: Play a resource transmission animation in the object display region in a process of transmitting the data resource corresponding to the target message to the target object.

Figure 5I:
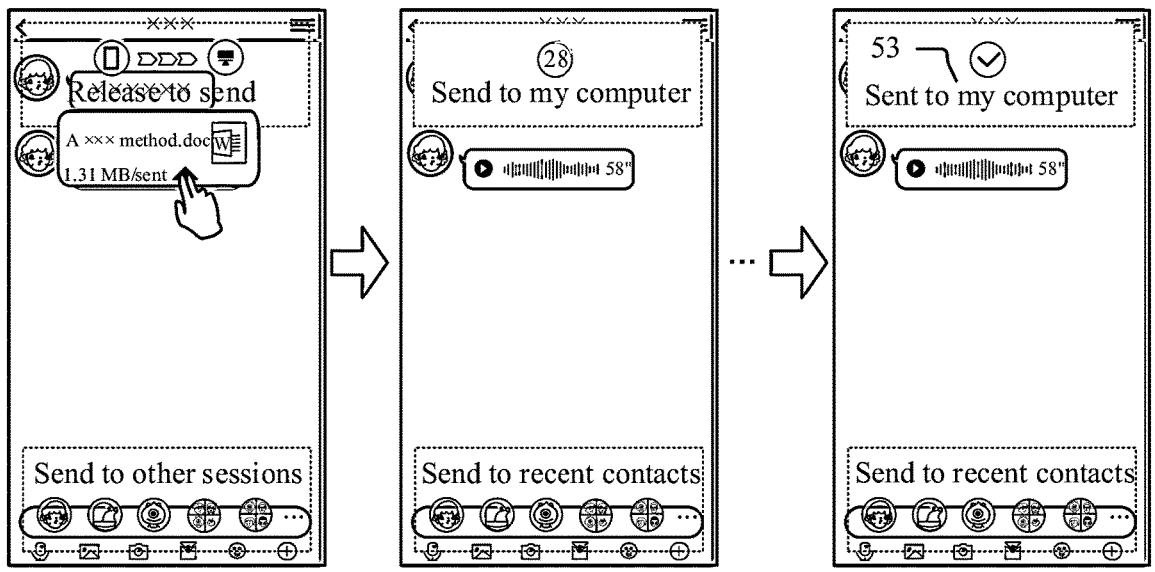
FIG. 5i is a schematic diagram of playing a resource transmission animation according to an embodiment of the present disclosure.
Figure 5J:
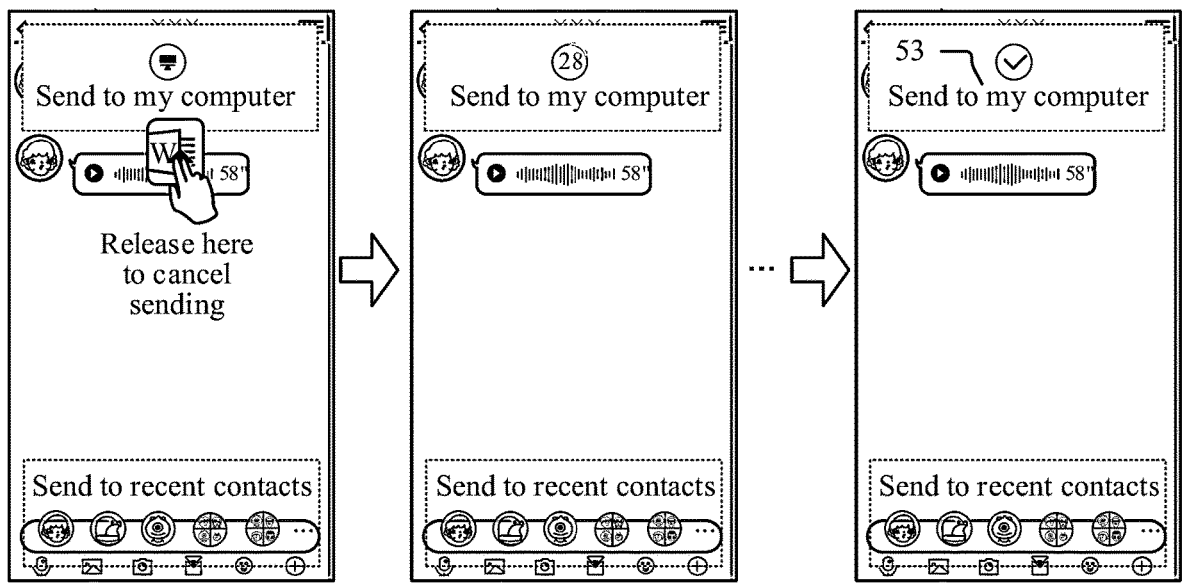
FIG. 5j is a schematic diagram of playing another resource transmission animation according to an embodiment of the present disclosure.
Figure 5K:
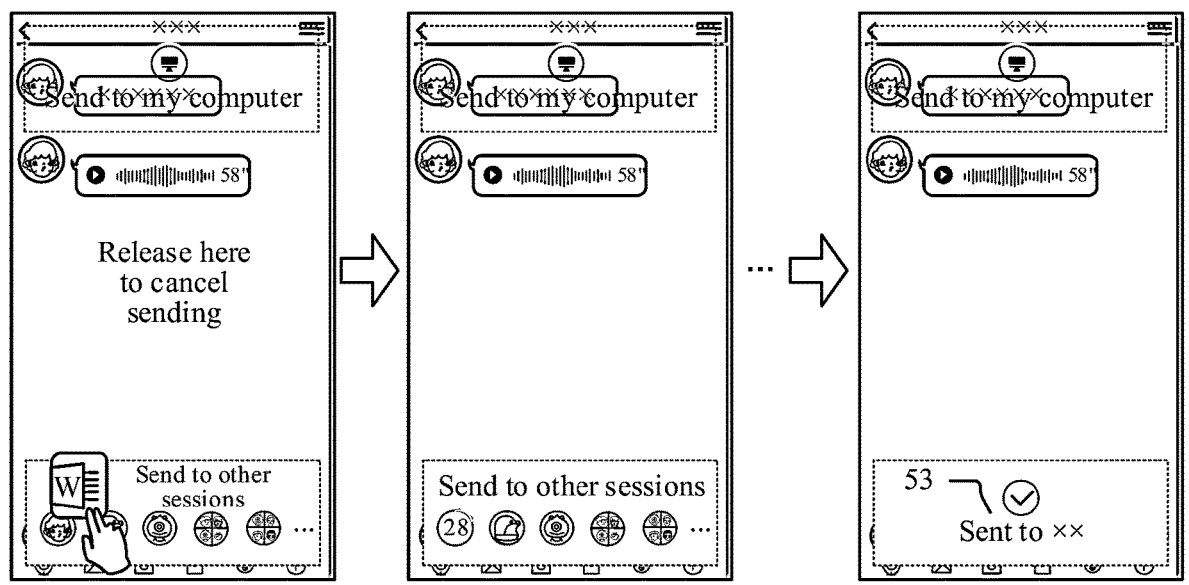
FIG. 5k is a schematic diagram of playing still another resource transmission animation according to an embodiment of the present disclosure.

The resource transmission animation reflects a transmission progress of the data resource corresponding to the target message. Specifically, the resource transmission animation may include, but not limited to, an animation that dynamically displays the transmission progress, an animation that dynamically displays the remaining duration required for the transmission, and the like. Using an example in which the resource transmission animation includes the animation that dynamically displays the transmission progress, a schematic diagram of playing the resource transmission animation in the object display region may be shown in FIG. 5i, FIG. 5j, or FIG. 5k. It is to be understood that each of FIG. 5i, FIG. 5j, and FIG. 5k merely exemplarily represents display forms (for example, display positions or shapes) of the resource transmission animation, which is not limited.

The transmission progress of the data resource mentioned in this embodiment of the present disclosure may refer to the progress of transmitting the data resource to the server by the target terminal; or may refer to the progress of transmitting the data resource to the target object through the server by the target terminal, which is not limited in this embodiment of the present disclosure. In addition, when the data resource is a file, the transmission progress of the data resource mentioned above may refer to a transmission progress of the file or a transmission progress of file information (for example, the file identifier or the file download address) of the file, which is not limited in this embodiment of the present disclosure either.

S406: Output prompt information in the object display region after finishing the transmission of the data resource corresponding to the target message.

The prompt information is used for prompting that the data resource is successfully transmitted to the target object or the data resource fails to be transmitted to the target object. Using an example in which the prompt information is used for prompting that the data resource is successfully transmitted to the target object, a schematic diagram of outputting prompt information 53 in the object display region may be shown in FIG. 5i, FIG. 5j, or FIG. 5k. The target terminal may automatically return to the session interface after outputting the prompt information; or may return to the session interface after detecting an interface return operation of the target user. In some embodiments, in the process of transmitting the data resource corresponding to the target message to the target object, the target terminal may not display the resource transmission animation, but directly output the prompt information in the object display region after finishing the transmission of the data resource corresponding to the target message.

In this embodiment of the present disclosure, after the target message in the session interface is triggered, the resource transmission interface may be directly outputted. The object display region in the resource transmission interface includes the object identifier of the at least one transmission object, and the icon display region in the resource transmission interface includes the message icon corresponding to the target message. By outputting the resource transmission interface, the user may trigger the terminal to determine the target object from the at least one transmission object according to the end point of the movement track of the message icon and transmit the data resource corresponding to the target message to the target object only by moving the message icon from the icon display region to the object display region. In this way, the user operation process of the resource transmission can be effectively simplified, and the efficiency of the resource transmission can be improved.

Figure 6:
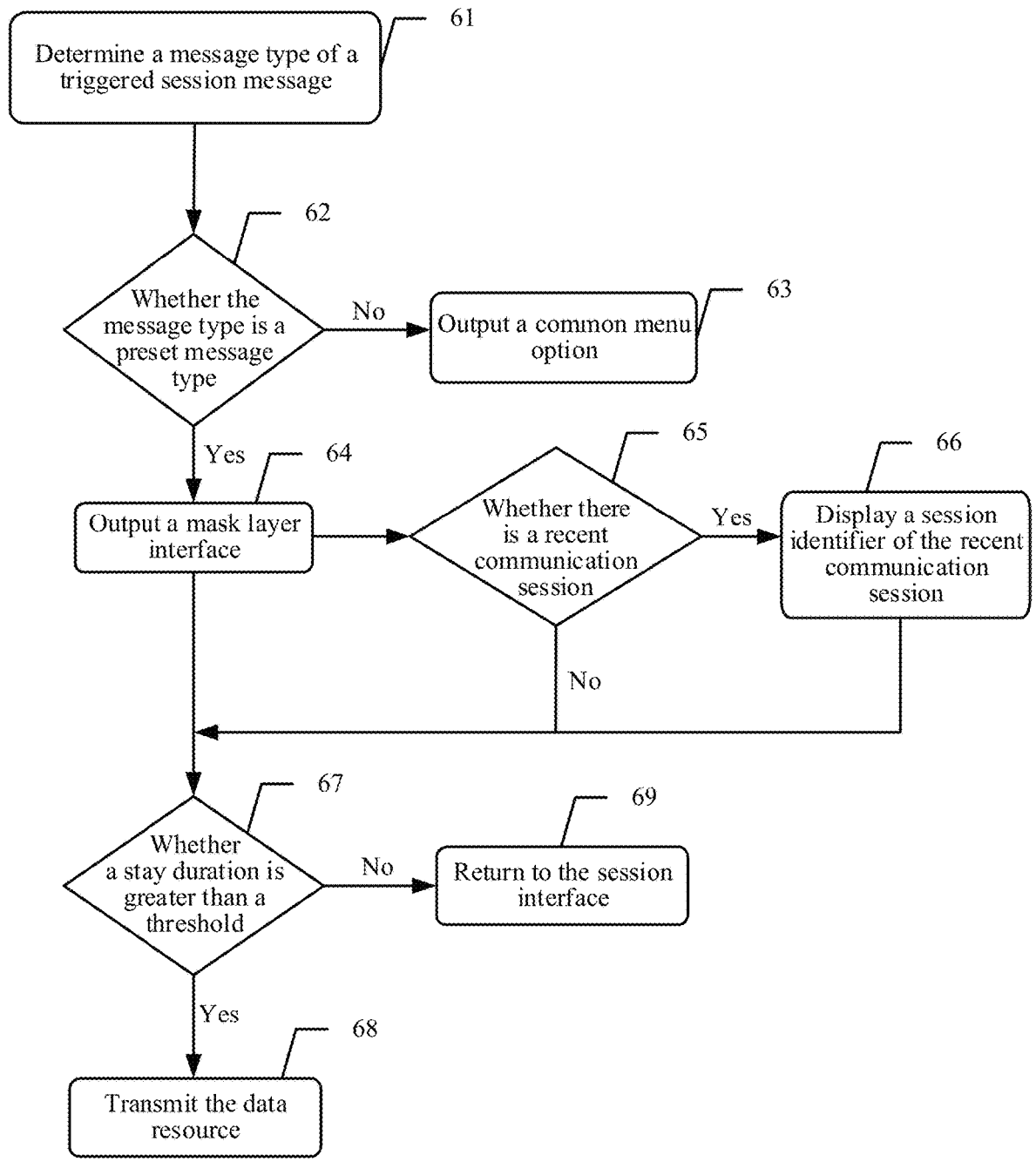
FIG. 6 is a schematic flowchart of a data transmission method according to still another embodiment of the present disclosure.

Based on the related description of the foregoing method embodiment, an embodiment of the present disclosure further provides a data transmission method shown in FIG. 6. In this embodiment of the present disclosure, the description is performed mainly using an example in which a target terminal performs the data transmission method and a terminal identifier of an associated terminal is displayed in an object display region by default. Specifically, when a target user (that is, a user who logs in to a social account using the target terminal) opens a target session using the target terminal, the target terminal may display one or more session messages in a session interface of the target session. When the target user performs a trigger operation on a certain session message in the session interface, the target terminal may determine a message type of the triggered session message through step s61, and detect, through step s62, whether the message type of the triggered session message is a preset message type such as a file type, a text type, a multimedia data type, or a link type. If the message type of the triggered session message is not the preset message type, the target terminal may output a common menu option including a forwarding component through step s63, so that the target user may transmit a data resource corresponding to the triggered session message to a target object through the forwarding component. The target object herein refers to an object about to receive the data resource corresponding to the triggered session message.

If the message type of the triggered session message is the preset message type, the target terminal may output a resource transmission interface (for example, a mask layer interface) for the target user through step s64; and display a message icon corresponding to the triggered session message in an icon display region in the resource transmission interface and display the terminal identifier of the associated terminal in a first sub-region in the object display region. The display principle of the message icon is as follows: The target terminal may transmit a message parameter (for example, a message type) of the triggered session message to Activity (a component) of the resource transmission interface, so that the Activity may display the message icon of the triggered session message in the icon display region according to the message parameter. In addition, the target terminal may further detect, through step s65, whether there is a recent communication session of the target user. If so, the target terminal may display a session identifier of the recent communication session in a second sub-region in the object display region through step s66.

Correspondingly, the target user may press and drag the message icon to any sub-region of the object display region with double fingers, to trigger the target terminal to transmit the data resource corresponding to the triggered session message to the target object. The target object herein may be the associated terminal or the recent communication session indicated by the session identifier corresponding to positions of touch points of the target user's fingers. Correspondingly, after detecting that the message icon is located in the object display region, the target terminal may detect, through step s67, whether a stay duration of the message icon in the object display region is greater than a duration threshold (for example, 1 second). If the stay duration is greater than the duration threshold, the target terminal may request a server to transmit the data resource corresponding to the triggered session message to the target object through step s68. Otherwise, the target terminal cancels the transmission of the data resource of the triggered session message, and returns to the session interface through step s69.

In this embodiment of the present disclosure, by outputting the resource transmission interface, the user can transmit the data resource corresponding to the triggered session message only by moving the message icon from the icon display region to the object display region. In this way, the user operation process of the resource transmission can be effectively simplified, and the efficiency of the resource transmission can be improved. In addition, the exposure degree of the associated terminal can be further effectively improved by displaying the terminal identifier of the associated terminal by default when the resource transmission interface is outputted.

Figure 7:
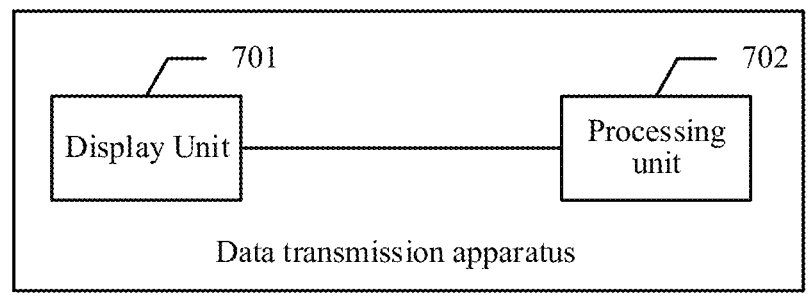
FIG. 7 is a schematic structural diagram of a data transmission apparatus according to an embodiment of the present disclosure.

Based on the description of the foregoing embodiments of the data transmission methods, an embodiment of the present disclosure further discloses a data transmission apparatus. The data transmission apparatus may be a computer program (including program code) run in the above-mentioned target terminal. The data transmission apparatus may perform the method shown in FIG. 2 or FIG. 4. Referring to FIG. 7, the data transmission apparatus may run the following units:

a display unit 701, configured to display a target message in a session interface, the target message being corresponding to a data resource;

the display unit 701 being configured to output a resource transmission interface in response to a trigger operation on the target message, the resource transmission interface including an object display region and an icon display region; and the object display region including an object identifier of at least one transmission object, and the icon display region including a message icon corresponding to the target message, the transmission object being an object capable of receiving the data resource corresponding to the target message;

the display unit 701 being further configured to move the message icon from the icon display region to the object display region according to a moving operation on the message icon; and a processing unit 702, configured to transmit, in response to the message icon being moved to the object display region, the data resource corresponding to the target message to a target transmission object in the object display region, the target transmission object being determined from the at least one transmission object in the object display region according to a position of an end point of a movement track of the message icon.

In one embodiment, the resource transmission interface is a mask layer interface, and the moving operation is an operation of continuously pressing (e.g., holding) and dragging the message icon. The message icon being moved to the object display region means that the end point of the movement track of the message icon is located in the object display region. An icon style of the message icon is determined according to a message parameter of the target message, and the message parameter includes at least: a message type of the target message. The message type of the target message is: a file type, a text type, a multimedia data type, or a link type; and the data resource corresponding to the target message is: a file, a text content, multimedia data, or a link.

In another embodiment, the at least one transmission object includes at least one of the following: an associated terminal associated with a target terminal, and at least one other session where a target user is present. The object identifier of the at least one transmission object includes at least one of the following: a terminal identifier of the associated terminal, and a session identifier of the at least one other session. The target terminal refers to a terminal for displaying the session interface, and the associated terminal refers to a terminal logging in to the same social account as the target terminal; and the target user refers to a user who logs in to a social account in the target terminal.

In still another embodiment, the object display region includes at least one of the following sub-regions: a first sub-region and a second sub-region. The first sub-region is used for displaying the terminal identifier of the associated terminal, and the second sub-region is used for displaying the session identifier of the at least one other session. When the end point of the movement track is located in the first sub-region, the target transmission object is the associated terminal; and when the end point of the movement track is located in the second sub-region, the target transmission object is a target session in the at least one other session. The target session satisfies the following condition: a distance between a display position of a session identifier of the target session and a position of the end point of the movement track is less than or equal to a distance threshold.

In still another embodiment, the display unit 701 may be further configured to display a first prompt in the icon display region in a process of moving the message icon to the object display region. The first prompt is used for prompting that when a pressing operation on the message icon is canceled in the icon display region, transmission of the data resource corresponding to the target message is canceled.

In still another embodiment, the display unit 701 may be further configured to highlight, when the message icon is moved to the object display region, the sub-region where the message icon is located.

In still another embodiment, the sub-region where the message icon is located is the second sub-region. Correspondingly, the display unit 701 may be further configured to synchronously update, when the sub-region where the message icon is located is highlighted, a display state of the session identifier of each of the at least one other session in the second sub-region to a to-be-selected state; and switch, when the message icon is moved to a display position of the session identifier of one of the at least one other session, the display state of the session identifier of the one of the at least one other session from the to-be-selected state to a selected state.

In still another embodiment, after the moving the message icon to the object display region, correspondingly, the display unit 701 may be further configured to play a transmission indication animation in the object display region according to a pressing duration for which the message icon is pressed in the object display region, the transmission indication animation indicating a remaining duration to wait until the transmission of the data resource corresponding to the target message; and perform, after finishing playing the transmission indication animation, an operation of transmitting the data resource corresponding to the target message to the target transmission object.

In still another embodiment, after the finishing playing the transmission indication animation, correspondingly, the display unit 701 may be further configured to output a second prompt in the object display region, the second prompt being used for prompting to cancel the pressing operation on the message icon, to transmit the data resource corresponding to the target message; and perform, when the pressing operation on the message icon is canceled, the operation of transmitting the data resource corresponding to the target message to the target transmission object.

In still another embodiment, the object display region further includes a waiting progress bar including a plurality of sub-progress bars. A display state of each sub-progress bar is a first state, and a sub-progress bar corresponds to a duration interval. Correspondingly, when being configured to play a transmission indication animation in the object display region according to a pressing duration for which the message icon is pressed in the object display region, the display unit 701 may be further configured to sequentially update the display state of each sub-progress bar in the waiting progress bar from the first state to a second state according to a change of the pressing duration for which the message icon is pressed in the object display region. The finishing playing the transmission indication animation means that the display state of each of all sub-progress bars in the waiting progress bar is the second state.

In still another embodiment, the display unit 701 may be further configured to return from the resource transmission interface to the session interface when the pressing operation on the message icon is canceled in the icon display region.

In still another embodiment, the display unit 701 may be further configured to play a resource transmission animation in the object display region in a process of transmitting the data resource corresponding to the target message to the target transmission object, the resource transmission animation reflecting a transmission progress of the data resource corresponding to the target message; and output prompt information in the object display region after finishing the transmission of the data resource corresponding to the target message, the prompt information being used for prompting that the data resource is successfully transmitted to the target transmission object or the data resource fails to be transmitted to the target transmission object.

According to an embodiment of the present disclosure, steps involved in the method shown in FIG. 2 or FIG. 4 may be performed by units in the data transmission apparatus shown in FIG. 7. In an example, steps S201 to S203 shown in FIG. 2 may be performed by the display unit 701 shown in FIG. 7 and step S204 may be performed by the processing unit 702 shown in FIG. 7. In another example, steps S401 to S403 and steps S405 to S406 shown in FIG. 4 may be performed by the display unit 701 shown in FIG. 7, and step S404 may be performed by the processing unit 702 shown in FIG. 7, and the like.

According to another embodiment of the present disclosure, the units of the data transmission apparatus shown in FIG. 7 may be separately or wholly combined into one or several other units, or one (or more) of the units may be further divided into a plurality of units having smaller functions. In this way, same operations may be implemented, and the implementation of the technical effects of the embodiments of the present disclosure is not affected. The foregoing units are divided based on logical functions. In an actual application, the functions of one unit may be implemented by a plurality of units, or the functions of a plurality of units may be implemented by one unit. In other embodiments of the present disclosure, the data transmission apparatus may also include other units. In an actual application, the functions may also be cooperatively implemented by other units and may be cooperatively implemented by a plurality of units.

According to another embodiment of the present disclosure, a computer program (including program code) that can perform the steps in the corresponding method shown in FIG. 2 or FIG. 4 may be run on a general computing device, such as a computer, which includes processing elements and storage elements such as a central processing unit (CPU), a random access memory (RAM), and a read-only memory (ROM), to construct the data transmission apparatus shown in FIG. 7 and implement the data transmission method in the embodiments of the present disclosure. The computer program may be recorded on, for example, a computer-readable recording medium, and may be loaded into the foregoing computing device by using the computer-readable recording medium and run in the computing device.

In this embodiment of the present disclosure, after the target message in the session interface is triggered, the resource transmission interface may be directly outputted. The object display region in the resource transmission interface includes the object identifier of the at least one transmission object, and the icon display region in the resource transmission interface includes the message icon corresponding to the target message. By outputting the resource transmission interface, the user may trigger the terminal to determine the target object from the at least one transmission object according to the end point of the movement track of the message icon and transmit the data resource corresponding to the target message to the target object only by moving the message icon from the icon display region to the object display region. In this way, the user operation process of the resource transmission can be effectively simplified, and the efficiency of the resource transmission can be improved.

Figure 8:
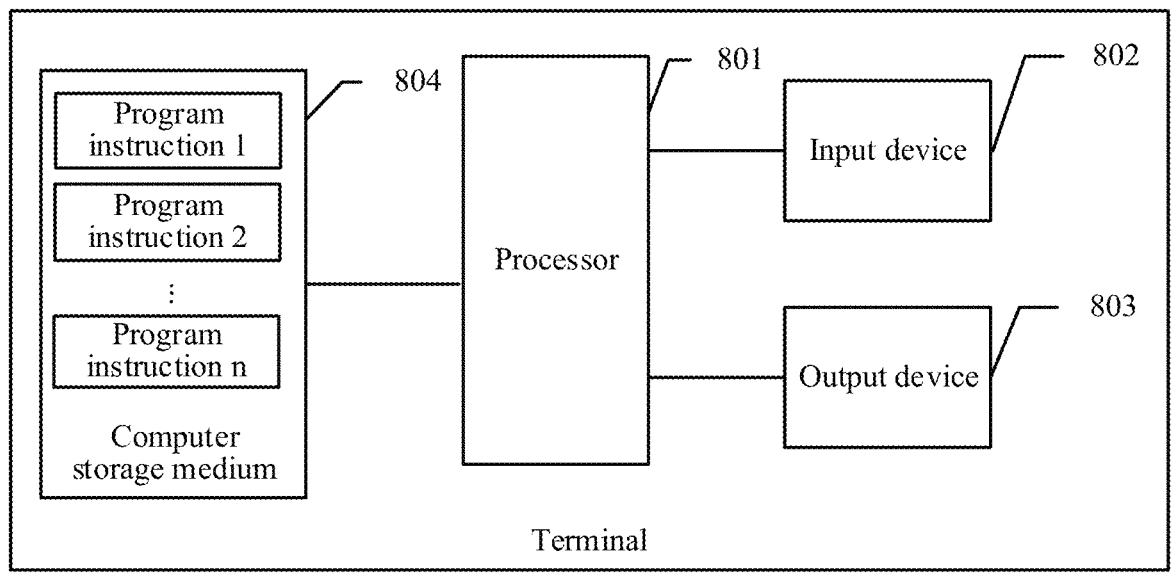
FIG. 8 is a schematic structural diagram of a terminal according to an embodiment of the present disclosure.

Based on the description of the method embodiment and the apparatus embodiment, an embodiment of the present disclosure further provides a terminal (that is, the above-mentioned target terminal). Referring to FIG. 8, the terminal may include at least: a processor 801, an input device 802, an output device 803, and a computer storage medium 804. The processor 801, the input device 802, the output device 803, and the computer storage medium 804 in the terminal may be connected by using a bus or in another manner.

The computer storage medium 804 may be stored in a memory of the terminal. The computer storage medium 804 is configured to store a computer program. The computer program includes program instructions. The processor 801 is configured to execute the program instructions stored in the computer storage medium 804. The processor 801 (or referred to as the central processing unit (CPU)) is a computing core and a control core of the terminal, is adapted to implement one or more instructions, and is specifically adapted to load and execute the one or more instructions to implement a corresponding method procedure or a corresponding function. In an embodiment, the processor 801 described in this embodiment of the present disclosure may be configured to perform a series of resource transmission processing, specifically including: displaying a target message in a session interface, the target message being corresponding to a data resource; outputting a resource transmission interface in response to a trigger operation on the target message, the resource transmission interface including an object display region and an icon display region; and the object display region including an object identifier of at least one transmission object, and the icon display region including a message icon corresponding to the target message, the transmission object being an object capable of receiving the data resource corresponding to the target message; moving the message icon from the icon display region to the object display region according to a moving operation on the message icon; and transmitting, in response to the message icon being moved to the object display region, the data resource corresponding to the target message to a target transmission object in the object display region, the target transmission object being determined from the at least one transmission object in the object display region according to a position of an end point of a movement track of the message icon; and the like.

An embodiment of the present disclosure further provides a computer storage medium (memory). The computer storage medium is a memory device in a terminal and is configured to store programs and data. It may be understood that the computer storage medium herein may include an internal storage medium in the terminal, and certainly may also include an extended storage medium supported by the terminal. The computer storage medium provides a storage space, and the storage space stores an operating system of the terminal. In addition, the storage space further stores the one or more instructions adapted to be loaded and executed by the processor 801. The instructions may be one or more computer programs (including program code), and are used for implementing the corresponding steps of the foregoing method in the embodiment related to the data transmission method described in the embodiments of the present disclosure. The computer storage medium herein may be a high-speed RAM memory, or may be a non-volatile memory such as at least one magnetic disk memory. In some embodiments, the computer storage medium may be at least one computer storage medium far away from the foregoing processor.

According to an aspect of the present disclosure, a computer program product or a computer program is further provided. The computer program product or the computer program includes computer instructions, and the computer instructions are stored in a computer-readable storage medium. A processor of a computer device reads the computer instructions from the computer-readable storage medium, and executes the computer instructions, so that the computer device performs the method provided in the optional manners of the foregoing embodiment of the data transmission method shown in FIG. 2 or FIG. 4.

Moreover, it is to be understood that the description disclosed above is merely exemplary embodiments of the present disclosure, and certainly is not intended to limit the scope of the claims of the present disclosure. Therefore, equivalent variations made according to the claims of the present disclosure shall fall within the scope of the present disclosure.

What is claimed is:

1. A data transmission method, performed by a terminal, the method comprising:
displaying a target message in a session interface, the target message comprising a data resource;
outputting a resource transmission interface in response to a trigger operation on the target message, the resource transmission interface comprising an object display region and an icon display region; and the object display region comprising an object identifier of at least one transmission object, and the icon display region comprising a message icon corresponding to the target message, the transmission object being an object capable of receiving the data resource corresponding to the target message;
moving the message icon from the icon display region to the object display region according to a moving operation on the message icon, wherein the moving operation includes an operation of continuously pressing and dragging the message icon;
in response to the message icon being moved to the object display region, playing a transmission indication animation in the object display region according to a pressing duration for which the message icon is pressed in the object display region, the transmission indication animation indicating a remaining duration to wait until a transmission of the data resource corresponding to the target message; and
transmitting, after finishing playing the transmission indication animation, the data resource corresponding to the target message to a target transmission object of the at least one transmission object in the object display region, the target transmission object being determined according to a position of an end point of a movement track of the message icon corresponding to the moving operation.

2. The method according to claim 1, wherein the resource transmission interface is a mask layer interface; and
an icon style of the message icon is determined according to a message parameter of the target message, and the message parameter comprises at least: a message type of the target message, wherein
the message type of the target message is: a file type, a text type, a multimedia data type, or a link type; and the data resource corresponding to the target message is: a file, a text content, multimedia data, or a link.

3. The method according to claim 1, wherein the at least one transmission object comprises at least one of: an associated terminal associated with a target terminal, or at least one other session where a target user is present; and the object identifier of the at least one transmission object comprises at least one of: a terminal identifier of the associated terminal, or a session identifier of the at least one other session, wherein
the target terminal refers to a terminal for displaying the session interface, and the associated terminal refers to a terminal logging in to a same social account of the target user as the target terminal; and the target user refers to a user who logs in to the social account in the target terminal.

4. The method according to claim 3, wherein the object display region comprises at least one of the following sub-regions: a first sub-region and a second sub-region; and the first sub-region is configured to display the terminal identifier of the associated terminal, and the second sub-region is configured to display the session identifier of the at least one other session, wherein when the end point of the movement track is located in the first sub-region, the target transmission object is the associated terminal; when the end point of the movement track is located in the second sub-region, the target transmission object is a target session in the at least one other session; and the target session satisfies the following condition: a distance between a display position of a session identifier of the target session and a position of the end point of the movement track is less than or equal to a distance threshold.

5. The method according to claim 4, wherein the method further comprises:

displaying a first prompt in the icon display region in a process of moving the message icon to the object display region, wherein the first prompt prompts that when a pressing operation on the message icon is canceled in the icon display region, transmission of the data resource corresponding to the target message is canceled.

6. The method according to claim 4, wherein the method further comprises:

highlighting, when the message icon is moved to the object display region, the sub-region where the message icon is located.

7. The method according to claim 6, wherein the sub-region where the message icon is located is the second sub-region, and the method further comprises:

synchronously updating, when the sub-region where the message icon is located is highlighted, a display state of the session identifier of each of the at least one other session in the second sub-region to a to-be-selected state; and switching, when the message icon is moved to a display position of the session identifier of one of the at least one other session, the display state of the session identifier of the one of the at least one other session from the to-be-selected state to a selected state.

8. The method according to claim 1, wherein after the finishing playing the transmission indication animation, the method further comprises:

outputting a second prompt in the object display region, the second prompt prompting to cancel a pressing operation on the message icon, to transmit the data resource corresponding to the target message; and performing, when the pressing operation on the message icon is canceled, the operation of transmitting the data resource corresponding to the target message to the target transmission object.

9. The method according to claim 1, wherein the object display region further comprises a waiting progress bar comprising a plurality of sub-progress bars; and a display state of each sub-progress bar is a first state, and a sub-progress bar corresponds to a duration interval; and the playing a transmission indication animation in the object display region according to a pressing duration for which the message icon is pressed in the object display region comprises:

sequentially updating the display state of each sub-progress bar in the waiting progress bar from the first state to a second state according to a change of the pressing duration for which the message icon is pressed in the object display region, wherein the finishing playing the transmission indication animation means that the display state of each of all sub-progress bars in the waiting progress bar is the second state.

10. The method according to claim 1, wherein the method further comprises:

returning from the resource transmission interface to the session interface when a pressing operation on the message icon is canceled in the icon display region.

11. The method according to claim 1, wherein the method further comprises:

playing a resource transmission animation in the object display region in a process of transmitting the data resource corresponding to the target message to the target transmission object, the resource transmission animation reflecting a transmission progress of the data resource corresponding to the target message; and outputting prompt information in the object display region after finishing the transmission of the data resource corresponding to the target message, the prompt information prompting that the data resource is successfully transmitted to the target transmission object or the data resource fails to be transmitted to the target transmission object.

12. A data transmission apparatus, comprising:

at least one processor, adapted to implement one or more instructions; and at least one computer storage medium, storing one or more instructions, the one or more instructions when being loaded and executed by the at least one processor, causing to the at least one processor to perform:

displaying a target message in a session interface, the target message comprising a data resource;

outputting a resource transmission interface in response to a trigger operation on the target message, the resource transmission interface comprising an object display region and an icon display region; and the object display region comprising an object identifier of at least one transmission object, and the icon display region comprising a message icon corresponding to the target message, the transmission object being an object capable of receiving the data resource corresponding to the target message;

moving the message icon from the icon display region to the object display region according to a moving operation on the message icon, wherein the moving operation includes an operation of continuously pressing and dragging the message icon;

in response to the message icon being moved to the object display region, playing a transmission indication animation in the object display region according to a pressing duration for which the message icon is pressed in the object display region, the transmission indication animation indicating a remaining duration to wait until a transmission of the data resource corresponding to the target message; and transmitting, after finishing playing the transmission indication animation, the data resource corresponding to the target message to a target transmission object of the at least one transmission object in the object display region, the target transmission object being determined according to a position of an end point of a movement track of the message icon corresponding to the moving operation.

13. The apparatus according to claim 12, wherein the resource transmission interface is a mask layer interface; and an icon style of the message icon is determined according to a message parameter of the target message, and the message parameter comprises at least: a message type of the target message, wherein the message type of the target message is: a file type, a text type, a multimedia data type, or a link type; and the data resource corresponding to the target message is: a file, a text content, multimedia data, or a link.

14. The apparatus according to claim 13, wherein the at least one transmission object comprises at least one of: an associated terminal associated with a target terminal, or at least one other session where a target user is present; and the object identifier of the at least one transmission object comprises at least one of: a terminal identifier of the associated terminal, or a session identifier of the at least one other session, wherein the target terminal refers to a terminal for displaying the session interface, and the associated terminal refers to a terminal logging in to a same social account of the target user as the target terminal; and the target user refers to a user who logs in to the social account in the target terminal.

15. The apparatus according to claim 14, wherein the object display region comprises at least one of the following sub-regions: a first sub-region and a second sub-region; and the first sub-region is configured to display the terminal identifier of the associated terminal, and the second sub-region is configured to display the session identifier of the at least one other session, wherein when the end point of the movement track is located in the first sub-region, the target transmission object is the associated terminal; when the end point of the movement track is located in the second sub-region, the target transmission object is a target session in the at least one other session; and the target session satisfies the following condition: a distance between a display position of a session identifier of the target session and a position of the end point of the movement track is less than or equal to a distance threshold.

16. The apparatus according to claim 15, wherein the at least one processor is further configured to perform:

displaying a first prompt in the icon display region in a process of moving the message icon to the object display region, wherein the first prompt prompts that when a pressing operation on the message icon is canceled in the icon display region, transmission of the data resource corresponding to the target message is canceled.

17. The apparatus according to claim 15, wherein the at least one processor is further configured to perform:

highlighting, when the message icon is moved to the object display region, the sub-region where the message icon is located.

18. The apparatus according to claim 17, wherein the sub-region where the message icon is located is the second sub-region, and the at least one processor is further configured to perform:

synchronously updating, when the sub-region where the message icon is located is highlighted, a display state of the session identifier of each of the at least one other session in the second sub-region to a to-be-selected state; and switching, when the message icon is moved to a display position of the session identifier of one of the at least one other session, the display state of the session identifier of the one of the at least one other session from the to-be-selected state to a selected state.

19. A non-transitory computer storage medium, storing one or more instructions, the one or more instructions being adapted to be loaded and executed by a least one processor to perform:

displaying a target message in a session interface, the target message comprising a data resource;

outputting a resource transmission interface in response to a trigger operation on the target message, the resource transmission interface comprising an object display region and an icon display region; and the object display region comprising an object identifier of at least one transmission object, and the icon display region comprising a message icon corresponding to the target message, the transmission object being an object capable of receiving the data resource corresponding to the target message;

moving the message icon from the icon display region to the object display region according to a moving operation on the message icon, wherein the moving operation includes an operation of continuously pressing and dragging the message icon;

in response to the message icon being moved to the object display region, playing a transmission indication animation in the object display region according to a pressing duration for which the message icon is pressed in the object display region, the transmission indication animation indicating a remaining duration to wait until a transmission of the data resource corresponding to the target message; and transmitting, after finishing playing the transmission indication animation, the data resource corresponding to the target message to a target transmission object of the at least one transmission object in the object display region, the target transmission object being determined according to a position of an end point of a movement track of the message icon corresponding to the moving operation.

* * * * *